US009528283B2

(12) United States Patent
Hall

(10) Patent No.: US 9,528,283 B2
(45) Date of Patent: Dec. 27, 2016

(54) METHOD OF PERFORMING AN INSTALLATION OF A DISPLAY UNIT

(71) Applicant: Ultravision Technologies, LLC, Dallas, TX (US)

(72) Inventor: William Y. Hall, Frisco, TX (US)

(73) Assignee: Ultravision Technologies, LLC, Dallas, TX (US)

( * ) Notice: Subject to any disclaimer, the term of this patent is extended or adjusted under 35 U.S.C. 154(b) by 0 days.

(21) Appl. No.: 14/641,189

(22) Filed: Mar. 6, 2015

(65) Prior Publication Data

US 2015/0243196 A1 Aug. 27, 2015

Related U.S. Application Data

(63) Continuation of application No. 14/582,908, filed on Dec. 24, 2014, now Pat. No. 9,416,551.

(60) Provisional application No. 62/025,463, filed on Jul. 16, 2014, provisional application No. 61/922,631,
(Continued)

(51) Int. Cl.

| | |
|---|---|
| ***B21D 47/00*** | (2006.01) |
| ***B21K 23/00*** | (2006.01) |
| ***B23P 17/00*** | (2006.01) |
| ***E04G 3/00*** | (2006.01) |
| ***G09F 21/04*** | (2006.01) |
| ***G09F 9/302*** | (2006.01) |

(52) U.S. Cl.
CPC ............... *E04G 3/00* (2013.01); *G09F 9/3026* (2013.01); *G09F 21/04* (2013.01); *Y10T 29/49124* (2015.01); *Y10T 29/49629* (2015.01); *Y10T 29/49826* (2015.01)

(58) Field of Classification Search
CPC .... G09F 9/3023; G09F 15/0068; A47F 5/105; Y10T 29/49629; Y10T 29/49826
USPC ..... 29/897.32, 425, 428, 469, 559, 829, 897
See application file for complete search history.

(56) References Cited

U.S. PATENT DOCUMENTS

| | | |
|---|---|---|
| 1,816,254 A | 7/1931 | Heath |
| 3,150,455 A | 9/1964 | Indorf |
| 4,457,090 A | 7/1984 | McDonough |

(Continued)

FOREIGN PATENT DOCUMENTS

| | | |
|---|---|---|
| CN | 201226214 Y | 4/2009 |
| CN | 201449702 | 5/2010 |

(Continued)

OTHER PUBLICATIONS

Daktronics, "The Smarter Approach to Digital Outdoor," Daktronics Digital Billboard Products, 2013, 16 pages.

(Continued)

*Primary Examiner* — Thiem Phan
(74) *Attorney, Agent, or Firm* — Slater Matsil, LLP

(57) ABSTRACT

A preassembled display system is assembled at a first location by attaching a plurality of display panels to a frame. The preassembled display system is loaded onto a transportation vehicle. Next, the preassembled display system is moved to a second located in a transportation vehicle. The display unit is installed at the second location by attaching the preassembled display system to a mounting unit. A receiver box for providing media to display at the plurality of display panels is attached. The attaching of the receiver box may be performed at the first location and/or at the second location. The plurality of display panels are electri-
(Continued)

cally connected to the receiver box. Again, the electrically connecting may be performed at the first location and/or at the second location.

30 Claims, 38 Drawing Sheets

Related U.S. Application Data filed on Dec. 31, 2013, provisional application No. 62/093,157, filed on Dec. 17, 2014.

(56) References Cited

U.S. PATENT DOCUMENTS

| | | | |
|---|---|---|---|
| 4,497,125 | A | 2/1985 | Hutchinson |
| 4,782,336 | A | 11/1988 | Bailey |
| 4,964,231 | A | 10/1990 | De Maat et al. |
| 5,172,504 | A | 12/1992 | De Maat et al. |
| 5,341,088 | A | 8/1994 | Davis |
| 5,523,769 | A | 6/1996 | Lauer et al. |
| 5,600,910 | A | 2/1997 | Blackburn |
| 5,722,767 | A | 3/1998 | Lin |
| 5,796,376 | A | 8/1998 | Banks |
| 5,900,850 | A | 5/1999 | Bailey et al. |
| 5,949,581 | A | 9/1999 | Kurtenbach et al. |
| 5,990,802 | A | 11/1999 | Maskeny |
| 6,045,240 | A | 4/2000 | Hochstein |
| 6,065,854 | A | 5/2000 | West et al. |
| 6,114,632 | A | 9/2000 | Planas, Sr. et al. |
| 6,175,342 | B1 | 1/2001 | Nicholson et al. |
| 6,237,290 | B1 | 5/2001 | Tokimoto et al. |
| 6,314,669 | B1 | 11/2001 | Tucker |
| 6,335,829 | B1 | 1/2002 | Van De Voorde |
| 6,362,801 | B1 | 3/2002 | Yuhara |
| 6,414,650 | B1 | 7/2002 | Nicholson et al. |
| 6,550,521 | B1 | 4/2003 | McNabb |
| 6,570,548 | B2 | 5/2003 | Smith |
| 6,634,124 | B1 | 10/2003 | Bierschbach |
| 6,657,605 | B1 | 12/2003 | Boldt, Jr. et al. |
| 6,677,918 | B2 | 1/2004 | Yuhara et al. |
| 6,737,983 | B1 | 5/2004 | Temple |
| 6,741,222 | B1 | 5/2004 | Tucker |
| 6,810,612 | B2 | 11/2004 | Huang |
| 6,813,853 | B1 | 11/2004 | Tucker |
| 6,819,303 | B1 | 11/2004 | Berger et al. |
| 6,998,538 | B1 | 2/2006 | Fetterolf, Sr. et al. |
| 7,055,271 | B2 | 6/2006 | Lutz et al. |
| 7,072,407 | B2 | 7/2006 | Schurig |
| 7,086,188 | B2 | 8/2006 | Tsao |
| 7,091,933 | B2 | 8/2006 | McClintock et al. |
| 7,161,558 | B1 | 1/2007 | Eidem et al. |
| 7,170,480 | B2 | 1/2007 | Boldt, Jr. et al. |
| 7,204,602 | B2 | 4/2007 | Archer |
| 7,267,459 | B2 | 9/2007 | Matheson |
| 7,319,408 | B2 | 1/2008 | Temple |
| 7,334,361 | B2 | 2/2008 | Schrimpf et al. |
| 7,355,562 | B2 | 4/2008 | Schubert et al. |
| 7,450,085 | B2 | 11/2008 | Thielemans et al. |
| 7,495,576 | B2 | 2/2009 | Maskeny et al. |
| 7,502,950 | B1 | 3/2009 | Brands |
| 7,557,781 | B2 | 7/2009 | Chuang et al. |
| 7,605,772 | B2 | 10/2009 | Syrstad |
| 7,674,000 | B2 | 3/2010 | Valerio, Jr. et al. |
| 7,688,280 | B2 | 3/2010 | Callegari et al. |
| 7,694,444 | B2 | 4/2010 | Miller et al. |
| 7,703,941 | B2 | 4/2010 | Lee |
| 7,774,968 | B2 | 8/2010 | Nearman et al. |
| 7,779,568 | B2 | 8/2010 | Gettelfinger et al. |
| 7,797,865 | B2 | 9/2010 | Patel et al. |
| 7,868,903 | B2 | 1/2011 | Wendler et al. |
| 7,869,198 | B1 | 1/2011 | Nearman et al. |
| 7,907,133 | B2 | 3/2011 | Joffer et al. |
| 7,926,213 | B1 | 4/2011 | Kludt et al. |
| 7,950,174 | B2 | 5/2011 | Xu |
| 7,971,378 | B2 | 7/2011 | Campoy Odena |
| 8,007,121 | B2 | 8/2011 | Elliott et al. |
| 8,016,452 | B2 | 9/2011 | Dunn |
| 8,066,403 | B2 | 11/2011 | Sanfilippo et al. |
| 8,074,387 | B2 | 12/2011 | Mancuso |
| 8,081,145 | B2 | 12/2011 | Ronkholz et al. |
| 8,104,204 | B1 | 1/2012 | Syrstad |
| 8,111,208 | B2 | 2/2012 | Brown |
| 8,115,229 | B2 | 2/2012 | Christy |
| 8,122,627 | B2 | 2/2012 | Miller |
| 8,130,175 | B1 | 3/2012 | Joffer et al. |
| 8,136,279 | B1 | 3/2012 | Nearman et al. |
| 8,154,864 | B1 | 4/2012 | Nearman et al. |
| 8,156,672 | B2 | 4/2012 | Xu |
| 8,168,990 | B2 | 5/2012 | Christy |
| 8,172,097 | B2 | 5/2012 | Nearman et al. |
| 8,184,114 | B2 | 5/2012 | Oh et al. |
| 8,228,261 | B2 | 7/2012 | Callegari et al. |
| 8,281,344 | B1 | 10/2012 | Mathias |
| 8,301,939 | B2 | 10/2012 | Gloege et al. |
| 8,314,433 | B2 | 11/2012 | Christy |
| 8,344,410 | B2 | 1/2013 | Wendler et al. |
| 8,350,788 | B1 | 1/2013 | Nearman et al. |
| 8,362,696 | B2 | 1/2013 | Zheng |
| 8,410,993 | B2 | 4/2013 | Jenks et al. |
| 8,414,149 | B2 | 4/2013 | Nearman |
| 8,434,898 | B2 | 5/2013 | Sanfilippo et al. |
| 8,552,928 | B2 | 10/2013 | Wendler et al. |
| 8,558,755 | B2 | 10/2013 | Kharrati et al. |
| 8,599,108 | B2 | 12/2013 | Kline et al. |
| 8,604,509 | B2 | 12/2013 | Wendler et al. |
| 8,648,774 | B2 | 2/2014 | Kline et al. |
| 8,702,048 | B2 | 4/2014 | Kludt et al. |
| 8,714,665 | B2 | 5/2014 | Campagna et al. |
| 8,766,880 | B2 | 7/2014 | Kharrati et al. |
| 8,803,766 | B2 | 8/2014 | Kline et al. |
| 8,824,124 | B1 | 9/2014 | Carlson et al. |
| 8,824,125 | B1 | 9/2014 | Cox et al. |
| 9,047,791 | B2 | 6/2015 | Cox et al. |
| 9,167,191 | B2 | 10/2015 | Kondo et al. |
| 2001/0037591 | A1 | 11/2001 | Nicholson et al. |
| 2002/0126086 | A1 | 9/2002 | Takeuchi et al. |
| 2002/0176267 | A1 | 11/2002 | Tanaka et al. |
| 2003/0146882 | A1 | 8/2003 | Ogino et al. |
| 2003/0158886 | A1 | 8/2003 | Walls et al. |
| 2004/0008155 | A1 | 1/2004 | Cok |
| 2004/0090391 | A1 | 5/2004 | Kondo |
| 2004/0104871 | A1 | 6/2004 | Boldt, Jr. et al. |
| 2004/0186723 | A1 | 9/2004 | Mizutani et al. |
| 2004/0196049 | A1 | 10/2004 | Yano et al. |
| 2004/0222941 | A1 | 11/2004 | Wong et al. |
| 2004/0240230 | A1 | 12/2004 | Kitajima et al. |
| 2005/0052374 | A1 | 3/2005 | Devos et al. |
| 2005/0052375 | A1 | 3/2005 | Devos et al. |
| 2005/0078104 | A1 | 4/2005 | Matthies et al. |
| 2005/0134525 | A1 | 6/2005 | Tanghe et al. |
| 2005/0134526 | A1 | 6/2005 | Willem et al. |
| 2005/0178034 | A1 | 8/2005 | Schubert et al. |
| 2005/0189311 | A1 | 9/2005 | Colby et al. |
| 2005/0190520 | A1 | 9/2005 | Schomaker et al. |
| 2005/0264471 | A1 | 12/2005 | Yamazaki et al. |
| 2006/0031720 | A1 | 2/2006 | Choi |
| 2006/0039142 | A1 | 2/2006 | Temple |
| 2006/0132048 | A1 | 6/2006 | Popovich |
| 2006/0164587 | A1 | 7/2006 | Oh |
| 2006/0170614 | A1 | 8/2006 | Tzong et al. |
| 2006/0185612 | A1 | 8/2006 | Bonner et al. |
| 2006/0241878 | A1 | 10/2006 | Jung et al. |
| 2006/0242871 | A1 | 11/2006 | Kondo et al. |
| 2006/0256033 | A1 | 11/2006 | Chan et al. |
| 2007/0000849 | A1 | 1/2007 | Lutz et al. |
| 2007/0279314 | A1 | 12/2007 | Brown |
| 2008/0047184 | A1 | 2/2008 | Dean |
| 2008/0078733 | A1 | 4/2008 | Nearman et al. |
| 2008/0141571 | A1 | 6/2008 | Kottwitz |
| 2008/0266206 | A1 | 10/2008 | Nelson et al. |
| 2008/0285087 | A1 | 11/2008 | Perkins et al. |
| 2008/0303747 | A1 | 12/2008 | Velicescu |
| 2009/0021532 | A1 | 1/2009 | Gloege et al. |

(56) References Cited

U.S. PATENT DOCUMENTS

| | | | |
|---|---|---|---|
| 2009/0024929 A1 | 1/2009 | Gloege et al. |
| 2009/0073080 A1 | 3/2009 | Meersman et al. |
| 2009/0096711 A1 | 4/2009 | Jang et al. |
| 2009/0146910 A1 | 6/2009 | Gardner |
| 2009/0146919 A1 | 6/2009 | Kline et al. |
| 2009/0147028 A1 | 6/2009 | Sefton et al. |
| 2009/0251391 A1 | 10/2009 | Ng et al. |
| 2009/0289160 A1 | 11/2009 | Kludt et al. |
| 2009/0322251 A1 | 12/2009 | Hilgers |
| 2010/0026973 A1 | 2/2010 | Hemphill et al. |
| 2010/0123732 A1 | 5/2010 | Jenks et al. |
| 2010/0251583 A1 | 10/2010 | Brown et al. |
| 2010/0288895 A1 | 11/2010 | Shamie |
| 2010/0295424 A1 | 11/2010 | Alexander |
| 2010/0309185 A1 | 12/2010 | Koester et al. |
| 2011/0025696 A1 | 2/2011 | Wyatt et al. |
| 2011/0096568 A1 | 4/2011 | Schattinger et al. |
| 2011/0134640 A1 | 6/2011 | Bertele |
| 2011/0168653 A1 | 7/2011 | Garrett et al. |
| 2011/0205757 A1 | 8/2011 | Whyte |
| 2011/0267328 A1 | 11/2011 | Venkatasubramanian et al. |
| 2012/0005563 A1 | 1/2012 | Gloege et al. |
| 2012/0019490 A1 | 1/2012 | Huang |
| 2012/0021873 A1 | 1/2012 | Brunner |
| 2012/0062540 A1 | 3/2012 | Quadri et al. |
| 2012/0112235 A1 | 5/2012 | Preuschl et al. |
| 2012/0218753 A1 | 8/2012 | Joffer et al. |
| 2012/0218758 A1 | 8/2012 | Wang et al. |
| 2012/0236509 A1 | 9/2012 | Cope et al. |
| 2012/0248950 A1 | 10/2012 | Nibori |
| 2012/0299480 A1 | 11/2012 | Peting et al. |
| 2013/0002634 A1 | 1/2013 | Wendler et al. |
| 2013/0182440 A1 | 7/2013 | Ferrie et al. |
| 2013/0271973 A1 | 10/2013 | Rycyna, III |
| 2013/0279161 A1 | 10/2013 | Pickard et al. |
| 2013/0321387 A1 | 12/2013 | Ohe |
| 2014/0259645 A1 | 9/2014 | Cox et al. |
| 2014/0267784 A1 | 9/2014 | Rykowski |
| 2014/0267896 A1 | 9/2014 | Cox et al. |
| 2015/0145851 A1 | 5/2015 | Takeda et al. |
| 2015/0205565 A1 | 7/2015 | Koguchi |

FOREIGN PATENT DOCUMENTS

| | | |
|---|---|---|
| CN | 201540699 | 8/2010 |
| CN | 202383944 | 8/2012 |
| CN | 103280164 A | 9/2013 |
| CN | 203250491 U | 10/2013 |
| CN | 203607050 U | 5/2014 |
| WO | 2005083660 | 9/2005 |
| WO | 2014005600 | 1/2014 |

OTHER PUBLICATIONS

Daktronics, “Daktronics LED Billboard Technology,” www.daktronics.com Nov. 14, 2013, 3 pages.

Ekta, “WOWStrip,” www.ekta-led.com, Jun. 19, 2014, 5 pages.

WOWstrip Semi-Transparent LED Displays product page, http://www.ekta-led.com/prod/68/17/190/, retrieved Jun. 19, 2014, 3 pages.

“What is IP? Explained: Ingress Protection rating (IP Rating, IP65-IP68) system,” Waterproof TVs Direct; Apr. 11, 2012; http://waterproftvs-direct.co.uk/blog/waterproof-tv/what-is-ip-ip-explained-ingress-protection-rating-ip-rating-ip65-ip68-system.

International Search Report and Written Opinion received in International Application No. PCT/US2014/072373 mailed May 27, 2015, 19 pages.

UK Intellectual Property Office, Search Report Cited by the Examiner in Application No. GB1518912.9, Mar. 2, 2016, pp. 1-6.

METHOD OF PERFORMING AN INSTALLATION OF A DISPLAY UNIT

This application is a continuation of Ser. No. 14/582,908 filed on Dec. 24, 2014, which claims the benefit of each of the following applications: U.S. Provisional Application No. 62/093,157, filed on Dec. 17, 2014, U.S. Provisional Application No. 62/025,463, filed on Jul. 16, 2014, and U.S. Provisional Application No. 61/922,631, filed on Dec. 31, 2013. The above listed applications are hereby incorporated herein by reference.

TECHNICAL FIELD

The present invention relates generally to displays, and, in particular embodiments, to a system and method for a modular display panels with different pitches.

BACKGROUND

Large displays (e.g., billboards), such as those commonly used for advertising in cities and along roads, generally have one or more pictures and/or text that are to be displayed under various light and weather conditions. As technology has advanced and introduced new lighting devices such as the light emitting diode (LED), such advances have been applied to large displays.

However, installation of such large displays is time consuming and an expensive operation. Further, the operating costs of these large displays may be large due to the difficulty of servicing such displays.

SUMMARY

Example embodiments of the present disclosure provide a system and method for installing preassembled modular display panels.

In accordance with an example embodiment of the present invention, a preassembled display system is assembled at a first location by attaching a plurality of display panels to a frame. The preassembled display system may be at least 6 ft.×12 ft. The preassembled display system is loaded onto a transportation vehicle. Next, the preassembled display system is moved to a second located in a transportation vehicle. The display unit is installed at the second location by attaching the preassembled display system to a mounting unit. A receiver box for providing media to display at the plurality of display panels is attached. The attaching of the receiver box may be performed at the first location and/or at the second location. The plurality of display panels are electrically connected to the receiver box. Again, the electrically connecting may be performed at the first location and/or at the second location.

In accordance with another example embodiment of the present invention, a plurality of display sections is assembled at a first location. Each display section includes a plurality of display panels mechanically attached to a frame. The assembled display sections are transported from the first location to a second location that is at least five miles away from the first location. The plurality of display sections is mounted at the second location to install the display unit. The display unit may be installed by attaching the frame of each display section to the frame of at least one other display section.

In accordance with another example embodiment of the present invention, a method of performing an installation of a display unit includes forming a preassembled display system at a first location by attaching a plurality of display panels to a frame, the preassembled display system being at least 6 ft.×12 ft. The preassembled display system is loaded onto a transportation vehicle and moved toward a second location in the transportation vehicle. At the second location, a preexisting display mounted on a mounting frame of a billboard is removed. The preassembled display system is lifted up as a single unit to the mounting frame and the preassembled display system is attached to the mounting frame of the billboard.

In accordance with another example embodiment of the present invention, a method of performing an installation of a display unit includes forming a preassembled display system at a first location by attaching a plurality of display panels to a frame, the preassembled display system being at least 6 ft.×12 ft. The preassembled display system is loaded onto a transportation vehicle and the transportation vehicle with the preassembled display system moved toward a second location. At the second location, the preassembled display system is lifted up as a single unit to a mounting point on a wall of a building and the preassembled display system is attached to the mounting point.

In accordance with another embodiment of the present invention, a method of installing modular display panels includes forming a preassembled display system at a first location by attaching a plurality of display panels to a frame, attaching a receiver box for providing media to display at the plurality of display panels, and electrically connecting the plurality of display panels to the receiver box. The preassembled display system is then shipped from the first location to a second location.

In accordance with another embodiment of the present invention, a method of installing modular display panels includes receiving a preassembled display system assembled at a first location, the preassembled display system comprising a plurality of display panels attached to a frame comprising a plurality of vertical beams, and a receiver box attached to the frame, and configured to provide media to display at the plurality of display panels, the plurality of display panels being electrically connected to the receiver box. At a second location, a preexisting display mounted on a mounting frame of a billboard is removed. The preassembled display system is attached to the mounting frame.

BRIEF DESCRIPTION OF THE DRAWINGS

For a more complete understanding of the present invention, and the advantages thereof, reference is now made to the following descriptions taken in conjunction with the accompanying drawings, in which:

FIGS. 7A-7C illustrate alternative embodiments of the modular display panel attached to a supporting frame in accordance with an embodiment of the present invention, wherein FIG. 7A illustrates a view highlighting the supporting frame, and wherein FIGS. 7B and 7C illustrate alternative structural embodiments of the supporting frame;

FIGS. 11A-11D illustrates an embodiment of the present invention for forming a large display panel by installing a plurality of preassembled display units or display sections, wherein FIG. 11A is a projection view, wherein FIG. 11B illustrates one example embodiment of the mechanical features used to align and/or mechanically support the plurality of preassembled display units, wherein FIG. 11C illustrates another embodiment in which some of the first features and second features may be interchanged to form a tighter fit, and wherein FIG. 11D illustrates a further embodiment showing additional adjustment features for adjusting the vertical and horizontal distance between adjacent preassembled display units;

FIGS. 12A-12C illustrates an on-site wall mounting of a preassembled display unit in accordance with an embodiment of the present invention, wherein FIG. 12A illustrates a front view of the mounting wall and FIG. 12B illustrates a side view illustrating the mounting wall and the mounted preassembled display unit, wherein FIG. 12C illustrates a side view of a further embodiment in which the plurality of beams is directly mounted to the mounting wall;

FIGS. 14A-14D illustrate specific examples of an assembled display system, wherein FIG. 14A illustrates that the modular preassembled display unit includes a number of display panels mounted to frame, wherein a side view of the display system is shown in FIG. 14B and back views are shown in FIGS. 14C and 14D;

FIGS. 14E-14G illustrate specific examples of a cage without the display panels that can be used with the system of FIGS. 14A-14D, wherein FIG. 14E illustrates the cage without the display panels, wherein other views of the frame are shown in FIGS. 14F and 14G;

FIGS. 15A-15E illustrate specific examples of an assembled display system, wherein FIG. 15A illustrates a preassembled display system in accordance with an embodiment of the present invention, wherein FIG. 15B illustrates a magnified view of the preassembled display system illustrated in FIG. 15A in accordance with an embodiment of the present invention, wherein FIG. 15C illustrates a preassembled display system including a non-linear shape in accordance with an embodiment of the present invention, wherein FIG. 15D illustrates a magnified portion of the base of a preassembled display system including a non-linear shape in accordance with an embodiment of the present invention, wherein FIG. 15E illustrates a preassembled display unit in which a receiver box is installed;

FIGS. 17A-17F illustrates different projection views of a preassembled display system illustrating the features used for stacking and alignment in accordance with an embodiment of the present invention, wherein FIG. 17A illustrates a preassembled display system in accordance with an embodiment of the present invention, wherein FIG. 17B illustrates another magnified projection view of the cage showing the platform and the second joining feature, wherein FIG. 17C illustrates a side projection view of the cage showing the platform and the second joining feature, wherein FIG. 17D illustrates a magnified projection view of another side of a cage showing a jack screw and a first joining feature, wherein FIG. 17E illustrates another magnified projection view showing the first joining feature and the jack screw, and wherein FIG. 17F illustrates a magnified back side projection view showing the first joining feature and the jack screw;

DETAILED DESCRIPTION OF ILLUSTRATIVE EMBODIMENTS

Installation of large display panels is a labor intensive process requiring skilled labor working in dangerous conditions for extended times. For example, to install a conventional display on a large multi-story building, the installers have to climb to the mounting wall (typically many stories high) and individually screw in each display and the corresponding cables etc. This is both time consuming and poses a significant safety threat thereby increasing the cost of the system dramatically.

Embodiments of the invention provide preassembled display panel units, each of which provides a completely self-contained building block that is lightweight. Because of the light weight capabilities, most of the assembly of the display units may be performed at a factory, assembly facility, or warehouse rather than on-site dramatically lowering the system cost.

These display units are designed to be weather proof, without a heavy cabinet, although it is understood that the present disclosure may be applied to lighting for any type of interior and/or exterior display. The lightweight design allows for easier installation and maintenance, thus lowering total cost of ownership.

Embodiments of the invention provide building block panels that are configurable with future expandability. These displays can offer complete expandability to upgrade in the future without having to replace the entire display. Installation is fast and easy with very little down-time, which allows any electronic message to be presented more quickly.

In some embodiments, the display panels are "hot swappable." By removing one screw in each of the four corners of the panel, servicing the display panel is fast and easy. Since a highly-trained, highly-paid electrician or technician is not needed to correct a problem, cost benefits can be achieved.

Figure 1:
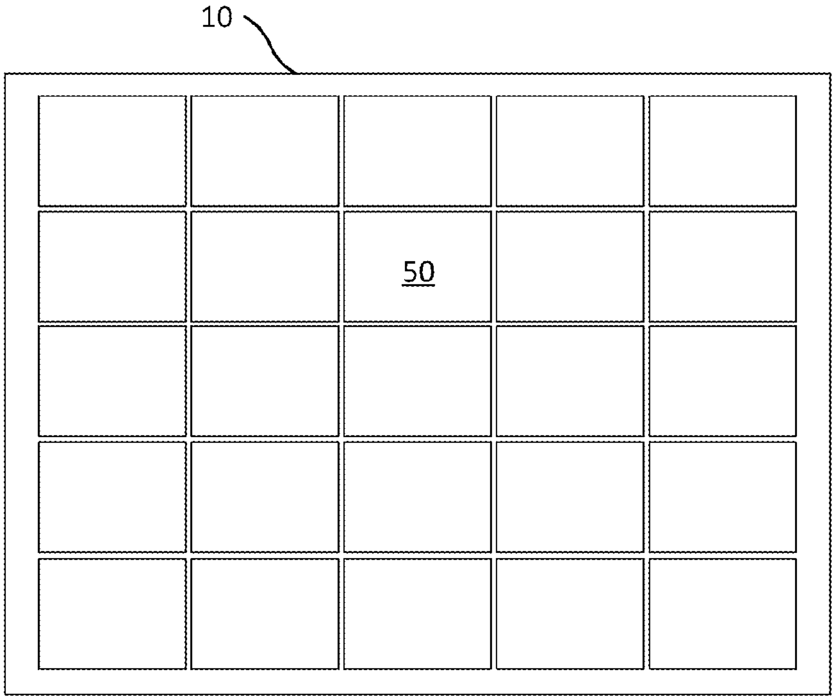
FIG. 1 illustrates a modular multi-resolution display system in accordance with embodiments of the present invention.
Figure 2:
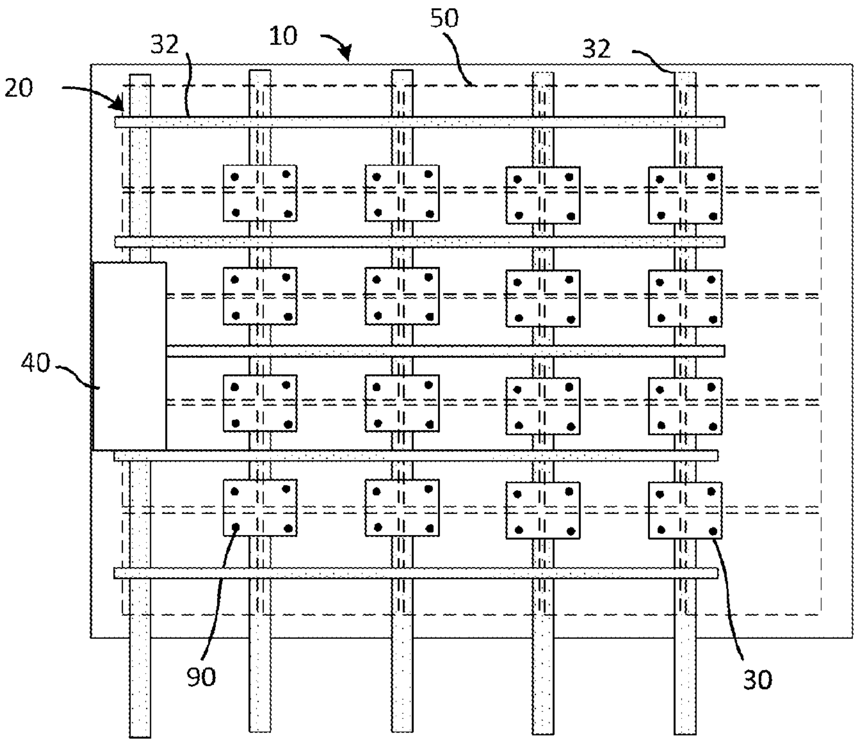
FIG. 2 illustrates a modular display panel attached to a supporting frame in accordance with an embodiment of the present invention.
Figure 3:
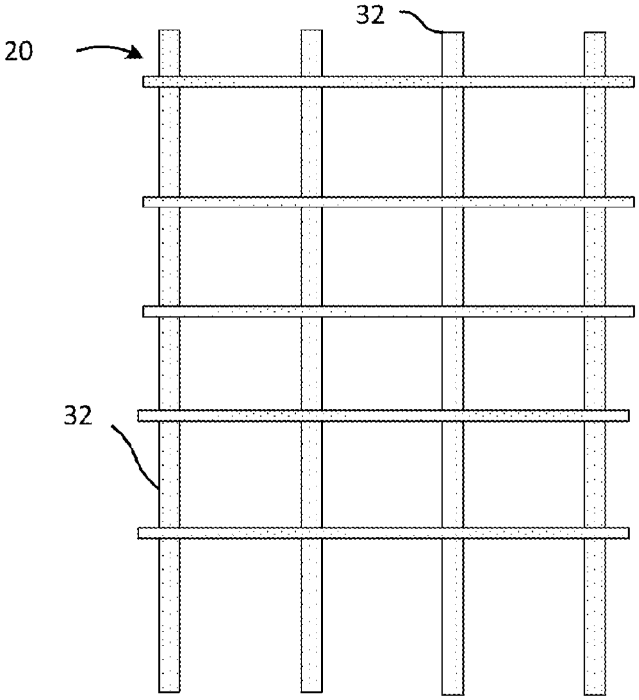
FIG. 3 illustrates a frame used to provide mechanical support to the modular display panel in accordance with an embodiment of the present invention.

FIG. 1 illustrates a modular display panel in accordance with an embodiment of the present invention. FIG. 2 illustrates a modular display panel attached to a supporting frame in accordance with an embodiment of the present invention. FIG. 3 illustrates a frame used to provide mechanical support to the modular display panel in accordance with an embodiment of the present invention.

The multi-panel modular preassembled display unit 10 comprises a plurality of LED display panels 50. In various embodiments describe herein, the light emitting diode (LED) display panels 50 are attached to a frame 20 or skeletal structure that provides the framework for supporting the LED display panels 50. The LED display panels 50 are stacked next to each other and securely attached to the frame 20 using attachment plate 30, which may be a corner plate in one embodiment. The attachment plate 30 may comprise holes through which attachment features 90 may be screwed in, for example.

Referring to FIGS. 1 and 2, the LED display panels 50 are arranged in an array of rows and columns. Each LED display panel 50 of each row is electrically connected to an adjacent LED display panel 50 within that row.

Referring to FIG. 3, the frame 20 provides mechanical support and electrical connectivity to each of the LED display panels 50. The frame 20 comprises a plurality of beams 32 forming the mechanical structure. The frame 20 comprises a top bar, a bottom bar, a left bar, a right bar, and a plurality of vertical bars extending from the top bar to the bottom bar, the vertical bars disposed between the left bar and the right bar. The top bar, the bottom bar, the left bar and the right bar comprise four inch aluminum bars and wherein the vertical bars comprise 2"×4"×½" aluminum tubes. The top bar, the bottom bar, the left bar and the right bar are each capable of bearing a load of 1.738 lb/ft and the vertical bars are each capable of bearing a load of 3.23 lb/ft.

The frame 20 may include support structures for the electrical cables, data cables, electrical power box powering the LED displays panels 50, data receiver box controlling power, data, and communication to the LED displays panels 50.

However, the frame 20 does not include any additional enclosures to protect the LED panels, data, power cables from the environment. Rather, the frame 20 is exposed to the elements and further exposes the LED display panels 50 to the environment. The frame 20 also does not include air conditioning, fans, heating units to maintain the temperature of the LED display panels 50. Rather, the LED display panels 50 are hermetically sealed themselves and are designed to be exposed to the outside ambient. Further, in various embodiments, there are no additional cabinets that are attached to the frame 20 or used for housing the LED display panels 50. Accordingly, in various embodiments, the multi-panel modular preassembled display unit 10 is designed to be only passively cooled.

Figure 4:
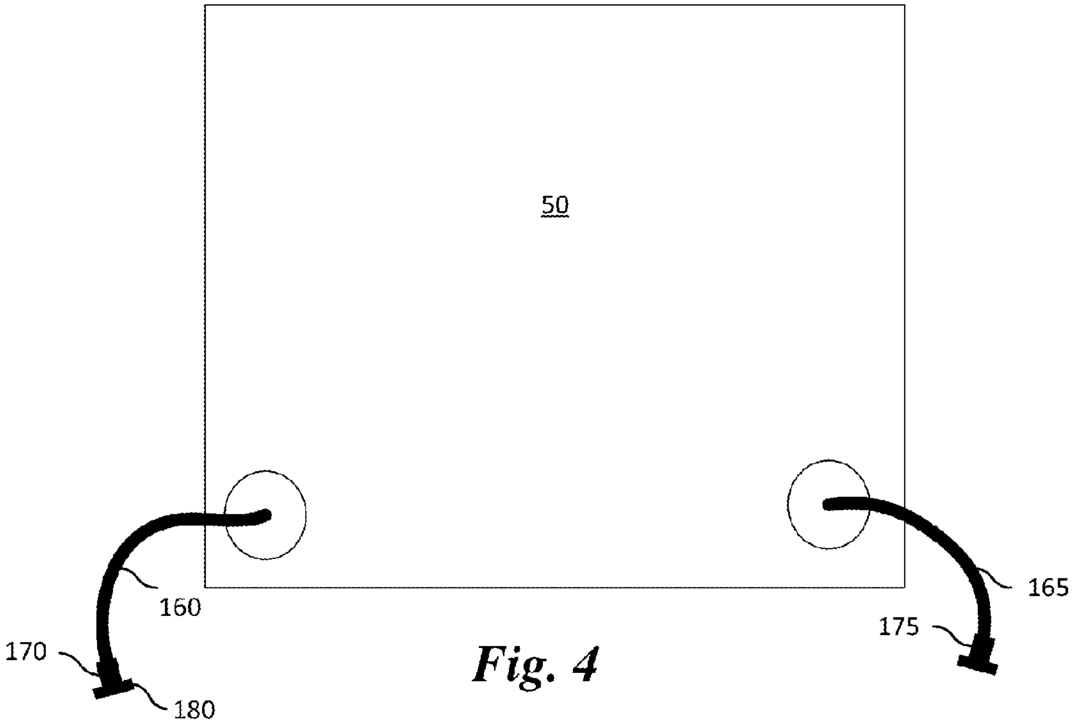
FIG. 4 illustrates one unit of the modular display panel in accordance with an embodiment of the present invention.

FIG. 4 illustrates one display panel 50 of the multi-panel modular preassembled display unit 10 comprising an input cable 160 and an output cable 165. The LED display panels 50 are electrically connected together for data and for power using the input cable 160 and the output cable 165.

Each modular LED display panel 50 is capable of receiving input using an integrated data and power cable from a preceding modular LED display panel and providing an output using another integrated data and power cable to a succeeding modular LED display panel. Each cable ends with an endpoint device or connector, which is a socket or alternatively a plug.

Referring to FIG. 4, in accordance with an embodiment, a LED display panel 50 comprises an attached input cable 160 and an output cable 165, a first connector 170, a second connector 175, a sealing cover 180. The sealing cover 180 is configured to go over the second connector 175 thereby hermetically sealing both ends (first connector 170 and the second connector 175). The sealing cover 180, which also includes a locking feature, locks the two cables together securely. The input cable 160 and the output cable 1365 comprise integrated data and power wires with appropriate insulation separating them.

Figure 5:
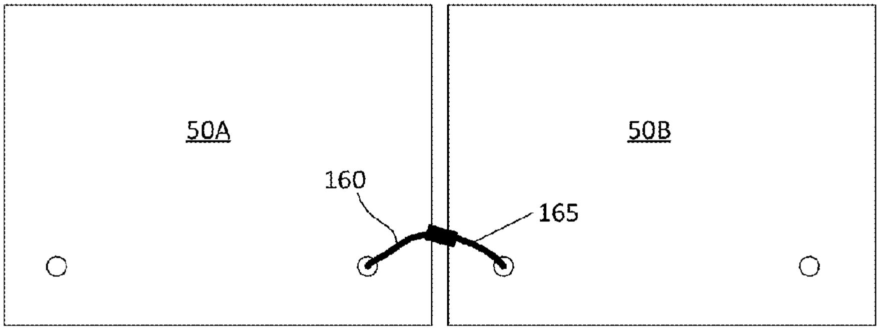
FIG. 5 illustrates a magnified view of two display panels next to each other and connected through the cables such that the output cable of the left display panel is connected with the input cable of the next display panel in accordance with an embodiment of the present invention.

FIG. 5 illustrates two display panels next to each other and connected through the cables such that the output cable 165 of the left display panel 50A is connected with the input cable 160 of the next display panel 50B. The sealing cover 180 locks the two cables together as described above.

Figure 6:
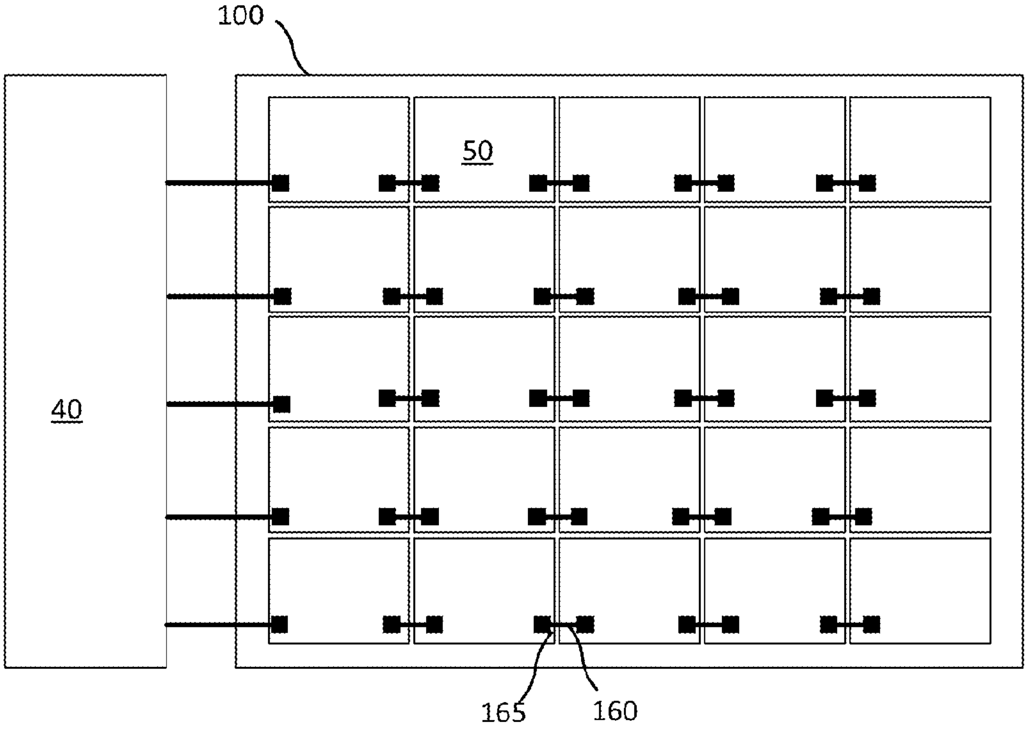
FIG. 6 illustrates a modular multi-panel display system comprising a plurality of LED display panels connected together using the afore-mentioned cables in accordance with an embodiment of the present invention.

FIG. 6 illustrates a modular multi-panel display system comprising a plurality of LED display panels connected together using the afore-mentioned cables.

Referring to FIG. 6, for each row, a LED display panel 50 at a first end receives an input data connection from a data source and has an output data connection to a next LED display panel in the row. Each further LED display panel 50 provides data to a next adjacent LED display panel until a LED display panel 50 at second end of the row is reached. The power line is run across each row to power the LED display panels 50 in that row.

In one embodiment, the plurality of LED display panels 50 are arranged in ten rows and thirty-two columns so that the integrated display panel 100 has a display surface that is approximately fifty feet and four inches wide and fifteen feet and eight and three-quarters inches high.

In various embodiments, as illustrated in FIGS. 2 and 6, a data receiver box 40 is mounted to the mechanical support structure or frame 20. The data receiver box 40 is configured to provide power, data, and communication to the LED display panels 50. With a shared receiver box 40, the panels themselves do not need their own receiver card. This configuration saves cost and weight.

Figure 7A:
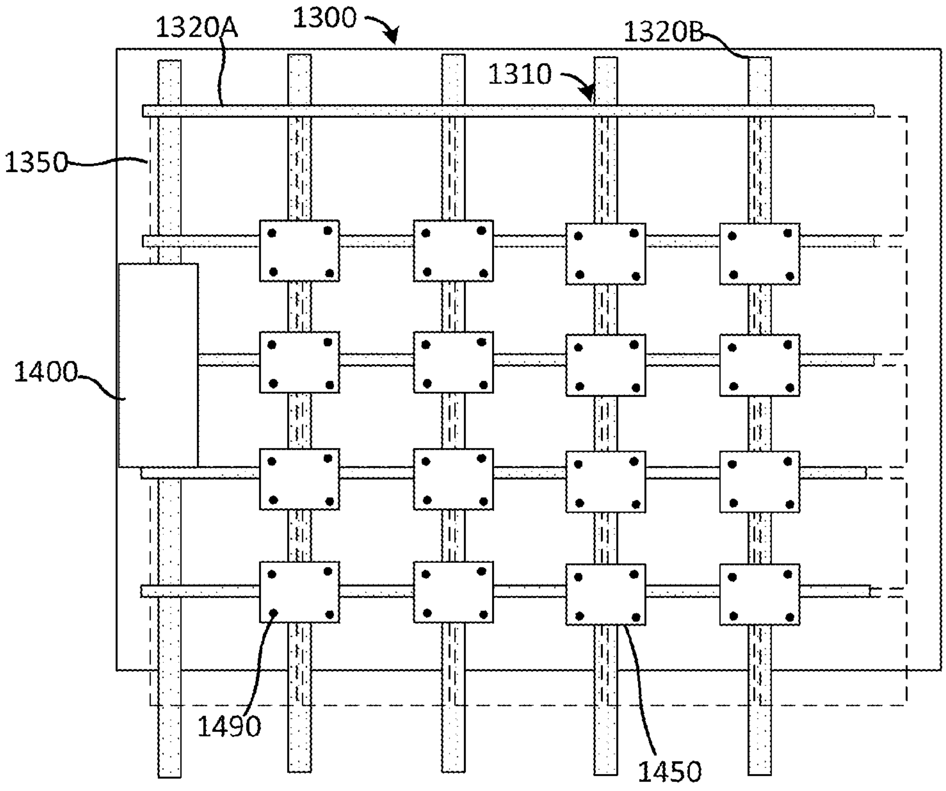
Figure 7B:
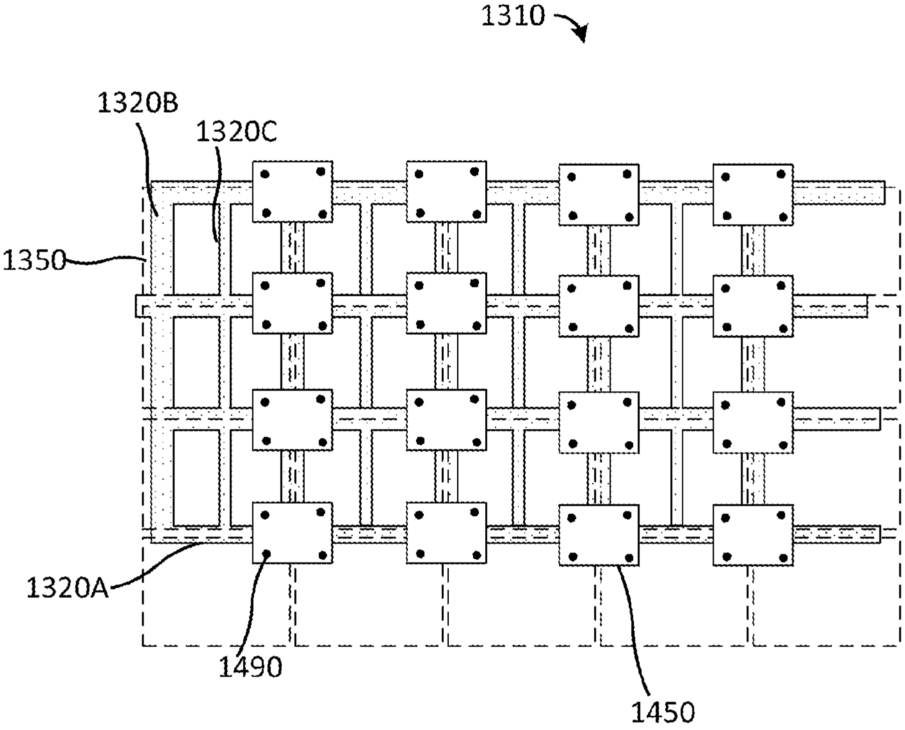

FIG. 7, which includes FIGS. 7A-7B, illustrates an alternative embodiment of the modular display panel attached to a supporting frame in accordance with an embodiment of the present invention.

This embodiment differs from embodiment described in FIG. 2 in that the horizontal beams 32A may be used to support the display panels 50. In one embodiment, both horizontal beams 32A and vertical beams 32B may be used to support the display panels 50. In another embodiment, horizontal beams 32A may be used to support the display panels 50 but the vertical beams 32B may be used to reinforce the frame structure rather than directly support the display panels 50.

FIG. 7B illustrates an alternative embodiment including additional beams 32C, which may be narrower than the other beams of the frame. One or more of the thinner beams 32C may be placed between the regular sized vertical beams 32B.

Figure 7C:
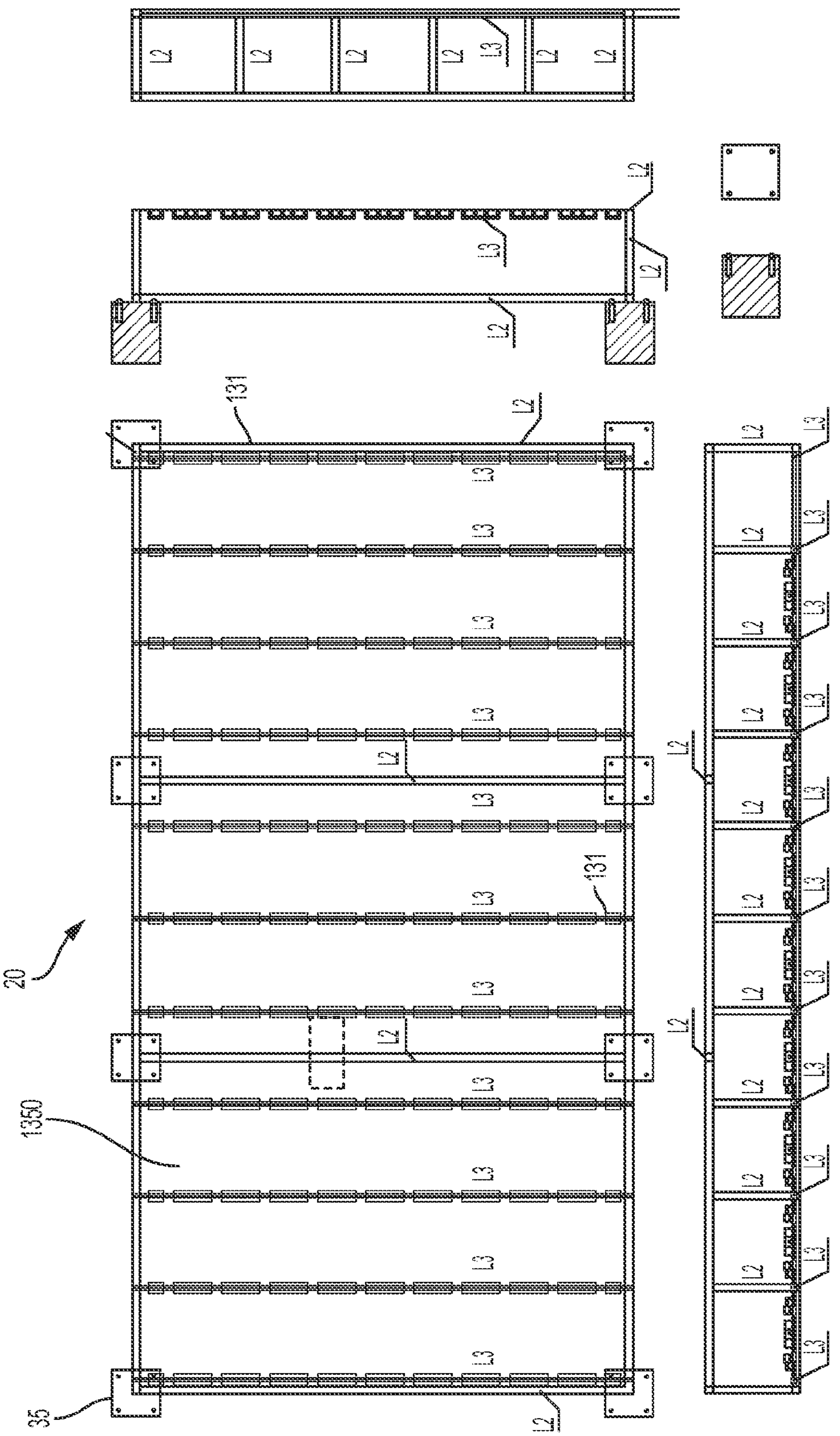

FIG. 7C illustrates a further embodiment illustrating both a top view, bottom view and side view of a frame. The frame 20 may be attached to a wall or other structure using plates 35. The frame 20 may comprise a plurality of vertical beams and horizontal beams. In one embodiment, the frame 20 comprises an outer frame having a top bar, a bottom bar, a left bar and a right bar. A display panel 50 may be supported between two adjacent beams 133 marked as L3 beams, which may be thinner (smaller diameter) and lighter than the thicker and heavier load bearing beams 131 marked as L2 beams used for forming the outer frame. As an illustration, the L2 beams may be 4" while the L3 beams may be 3" in one example.

Figure 8:
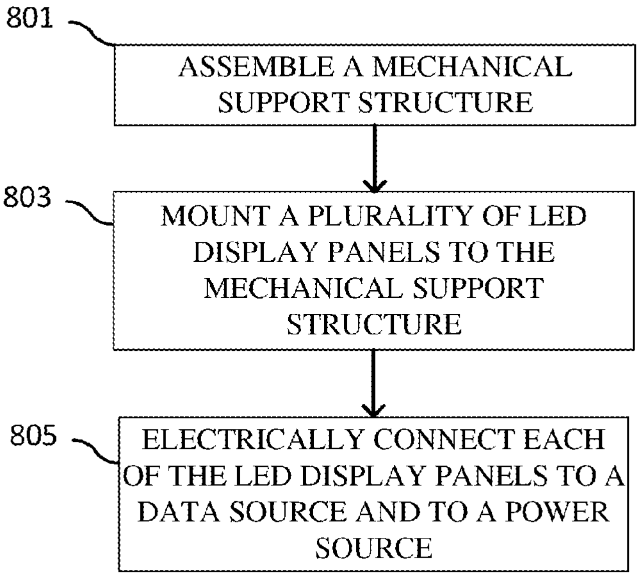
FIG. 8 illustrates a method of assembling a modular multi-panel display system in accordance with an embodiment of the present invention.

FIG. 8 illustrates a method of assembling a modular multi-panel display system in accordance with an embodiment of the present invention.

A mechanical support structure such as the frame 20 described above is assembled taking into account various parameters such as the size and weight of the multi-panel display, location and zoning requirements, and others (box 801). For example, as previously described, the mechanical support structure includes a plurality of vertical bars and horizontal bars. The mechanical support structure may be fabricated from a corrosion resistant material in one or more embodiments. For example, the mechanical support structure may be coated with a weather-proofing coating that prevents the underlying substrate from corroding. If a catwalk is needed, for example, the frame may include such a structure.

A plurality of LED display panels are mounted on to the mechanical support structure so as to form an integrated display panel that includes an array of rows and columns of LED display panels as described in various embodiments (box 803). Each of the LED display panels is hermetically sealed. Mounting the LED display panels may comprise mounting each LED display panel a respective vertical beam using an attachment plate.

Each of the LED display panels is electrically connected to a data source and to a power source (box 805). For example, a first LED display panel in each row is electrically coupled to the display source. The other LED display panels in each row may be daisy-chain coupled to an adjacent LED display panel.

Figure 9:
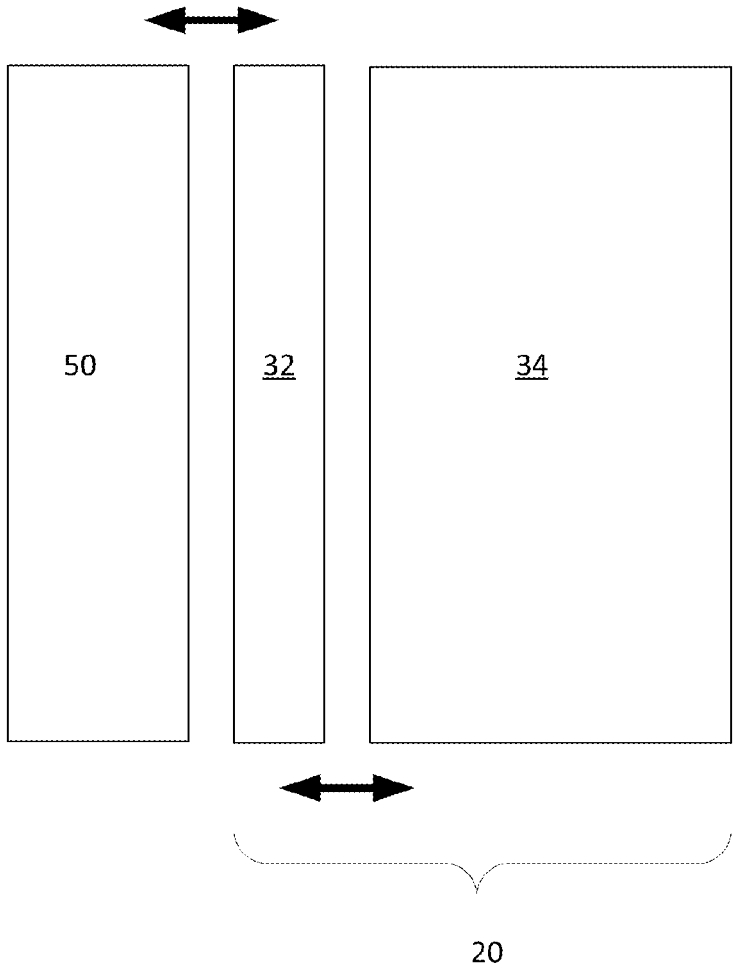
FIG. 9 illustrates a method of assembling a modular multi-panel display in accordance with an embodiment of the present invention.

FIG. 9 illustrates a method of assembling a modular multi-panel display in accordance with an embodiment of the present invention.

In one embodiment, referring to FIG. 9, the display panels 50 may be coupled (arrows) to vertical beams 32 using connecting plates 90 as illustrated in FIG. 2. The cage 34 is then attached (arrows) to the vertical beams 32 using another set of connecting plates.

Since the assembled display structure is light weight, significant assembly advantages can be achieved. For example, the panels can be assembled within a warehouse that is remote from the final location where the display will be utilized. In other words, the panels can be assembled at a first location, shipped to second location and finalized at the second location.

Figure 10:
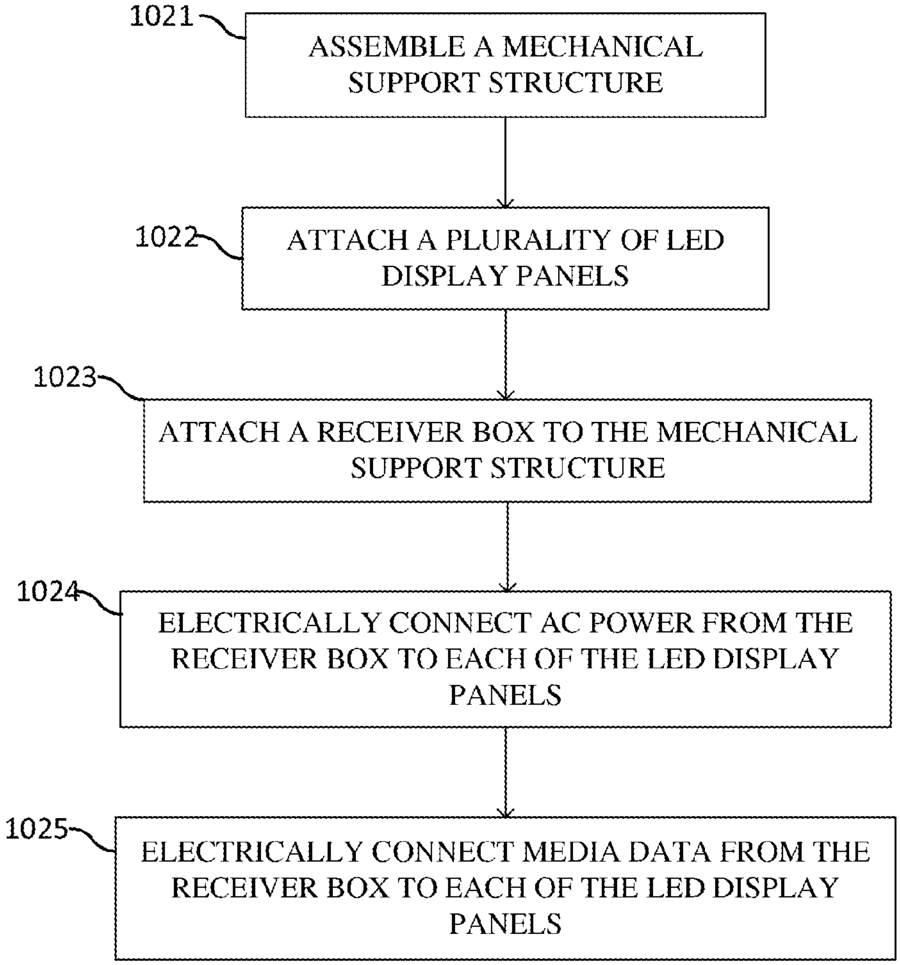
FIG. 10 illustrates a method of assembling a modular multi-panel display in accordance with an embodiment of the present invention.

FIG. 10 illustrates a method of forming preassembled modular multi-panel display in accordance with an embodiment of the present invention.

Referring to FIG. 10, a mechanical support structure such as a frame is assembled as described above in various embodiments (box 1021). A plurality of LED display panels is attached directly to the mechanical support structure using a plurality of coupling mechanisms (box 1022). The coupling mechanisms may include additional structures such as connecting plates, for example.

A receiver box is attached to the mechanical support structure (box 1023). In one embodiment, the receiver box includes power circuitry with an ac power input and an ac power output. The receiver box further includes digital circuitry configured to process media data to be displayed by the LED display panels. AC power from the receiver box is electrically connected to each of the LED display panels (box 1024). Media data from the receiver box is electrically connected to each of the LED display panels (box 1025). For example, a plurality of integrated data and power cables are interconnected.

Embodiments of the present invention will now be described to illustrate installation of the preassembled display panel system at an on-site location.

FIGS. 11A-11D illustrate an embodiment of the present invention for forming a large display panel by installing a plurality of preassembled display units or display sections.

In various embodiments, the preassembled display units 142 may be at least 12 ft×24 ft, i.e., which is 12 ft tall and 24 ft wide. Other common sizes for the preassembled display units 142 may comport to the standard billboard sizes used in the country of installation such as, for example, 6 ft×12 ft, 12 ft×25 ft, 10.5 ft×36 ft, 12 ft×40 ft, 14 ft×48 ft, 16 ft×60 ft, 20 ft×50 ft, and 20 ft×60 ft.

In one or more embodiments, the very large display panel may be formed by joining together a plurality of preassembled display units 142. For example, the largest size of the preassembled display units 142 may be limited by the size permitted for safe transportation in a rail car or truck or that needed for the particular application. As such, the preassembled display units 142 may not be larger than the maximum size allowed for transportation in a truck, which may be governed by local laws as well as practical limitations.

Each plurality of preassembled display units 142 may include one or more ladders 145 and one or more catwalks 140 for accessing the individual display panels conveniently. Further, the plurality of preassembled display units 142 may include doors 146L, 146R, which may be removed during the installation so as to form a continuous catwalk 140 from one display unit to another after the installation is completed. Alternatively, the doors may be opened as needed during operation of the display system by a servicing personal.

In various embodiments, the plurality of preassembled display units 142 includes the display panels and the receiver boxes mounted onto the frame. In some embodiments, each of the plurality of preassembled display units 142 may include completed electrical connections between the display panels and the receiver boxes.

In various embodiments, the plurality of preassembled display units 142 may be designed to accommodate specific features of the mounting wall or mounting billboard pillar. For example, mounting on to a historic building may require specific compliance with various rules with regard to the load bearing mechanical design, electrical design, appearance, and others. As the display system is factory assembled, these rules may be easily taken into account when designing and building the preassembled display unit.

Figure 11A:
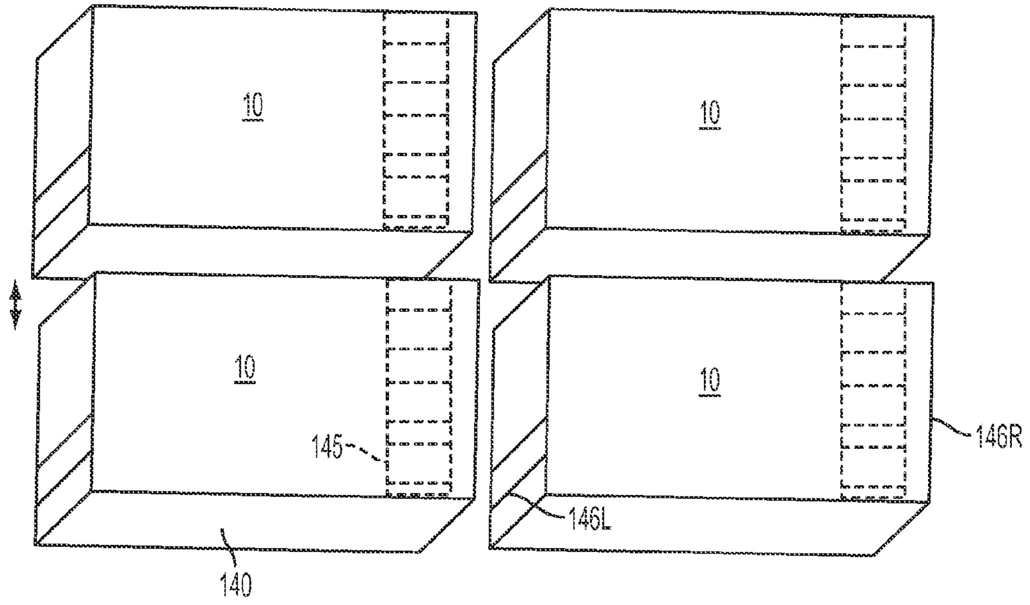

If the final size of the display panel is larger than the largest size of the preassembled display panel, a simple on-site installation may be performed to mechanically connect the individual plurality of preassembled display units 142 (shown by the arrows in FIG. 11A). For example, each of the plurality of preassembled display units 142 may include mechanical features so as to align and/or mechanically support the plurality of preassembled display units 142 stacked above. However, in various embodiments, the preassembled display unit 10 comprising the frame and a plurality of display panels are lifted and mounted together as one unit and stacked with other similar preassembled units.

Figure 11B:
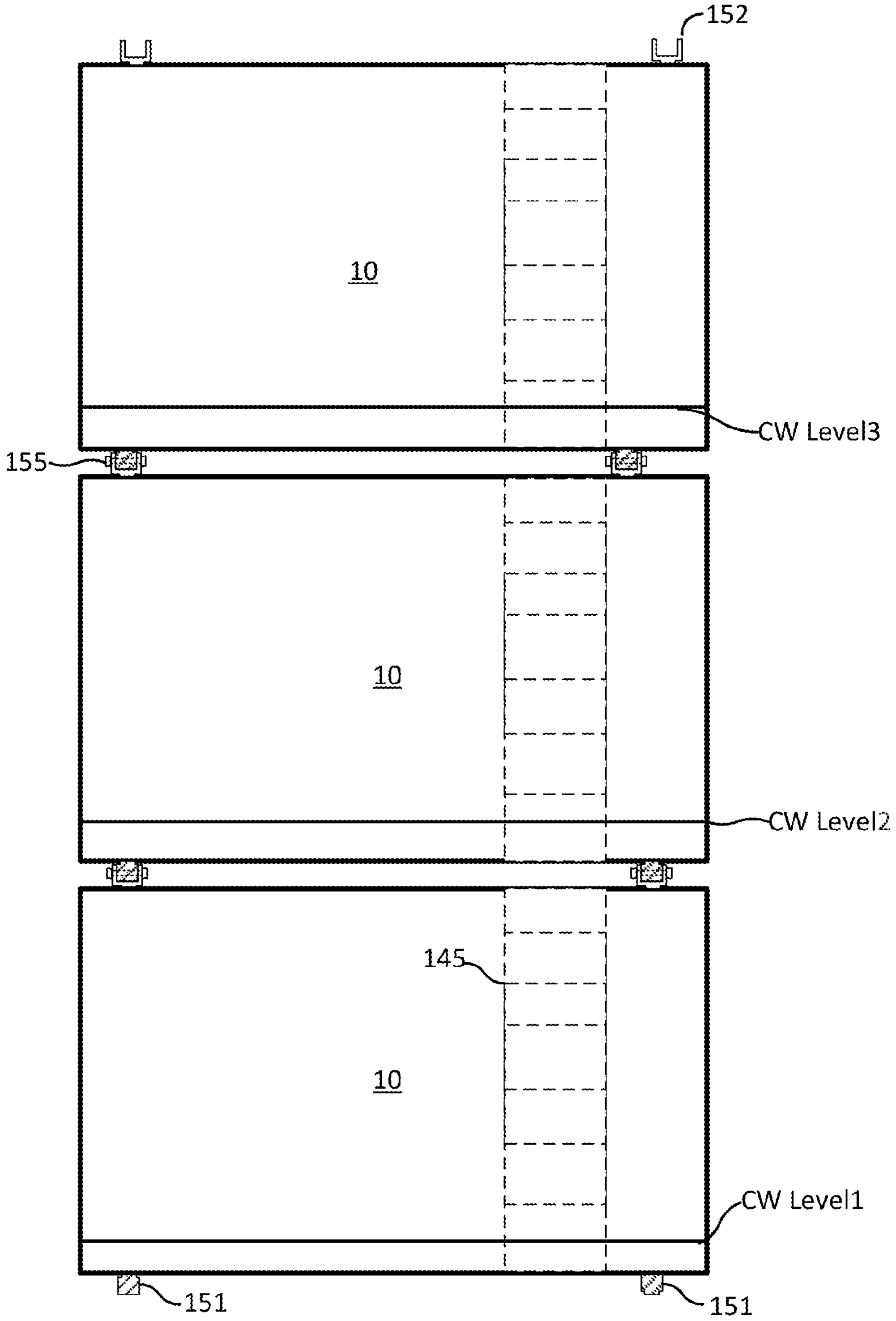

FIG. 11B illustrates one example embodiment of the mechanical features used to align and/or mechanically support the plurality of preassembled display units.

Referring to FIG. 11B, each of the preassembled display units 142 may include a ladder 145, which when aligned correctly forms a continuous vertical pathway to access various levels of the catwalk represented as CW Level 1, CW Level 2, CW Level 3. A good alignment of the preassembled display units 142 is necessary to provide a appealing visual effect as well as align the ladders 145 and the catwalk 140 in the adjacent preassembled display units 142. Accordingly, alignment features are provided, which may be used to align as well as to mechanically support the preassembled display units 142. For example, the alignment feature may be a telescopic joint, a slip joint, a ball and socket joint in various embodiments.

FIG. 11B illustrates a joint having a first joining feature 151, which may comprise a solid inner barrel or a hollow tube and a second joining feature 152, which may comprise a concentric barrel feature configured to receive the solid inner barrel or a hollow tube of the first joining feature 151. The second joining feature 152 may be a square pipe in one embodiment while the first joining feature 151 may be a solid square block, or even a square pipe in another embodiment. The first joining feature 151 has a smaller outer dimension than the second joining feature 152 so that it can slide into the second joining feature 152 in various embodiments.

One of the preassembled display units 142 may be positioned over another preassembled display units 142, and the first joining feature 151 inserted into the second joining feature 152. The joint may be secured using screw or bolts 155, for example. The preassembled display units 142 may comprise additional features such as leveling planes to ensure proper horizontal alignment.

The preassembled display units 142 are thus assembled to form one large display. Advantageously, in various embodiments, the installation of such a large panel can be accomplished in relatively short time duration without expending on-site labor. For example, on-site installation of a conventional system can be very labor intensive, which increases the cost and poses significant risk to the installer. As the preassembled panels are finished out in the factory, the on-site installation process is much easier reducing costs significantly.

Figure 11C:
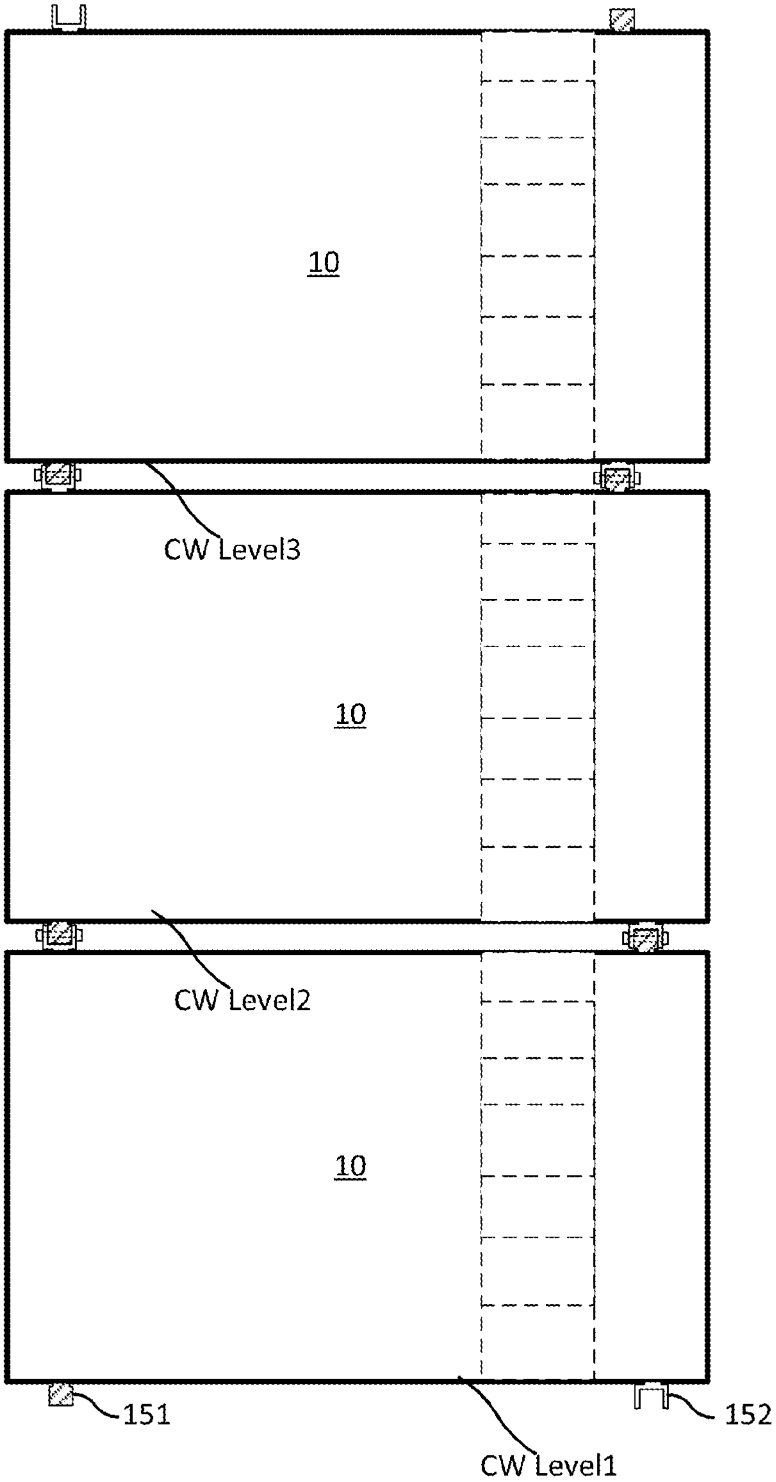

FIG. 11C illustrates another embodiment in which some of the first features and second features may be interchanged to form a tighter fit.

Figure 11D:
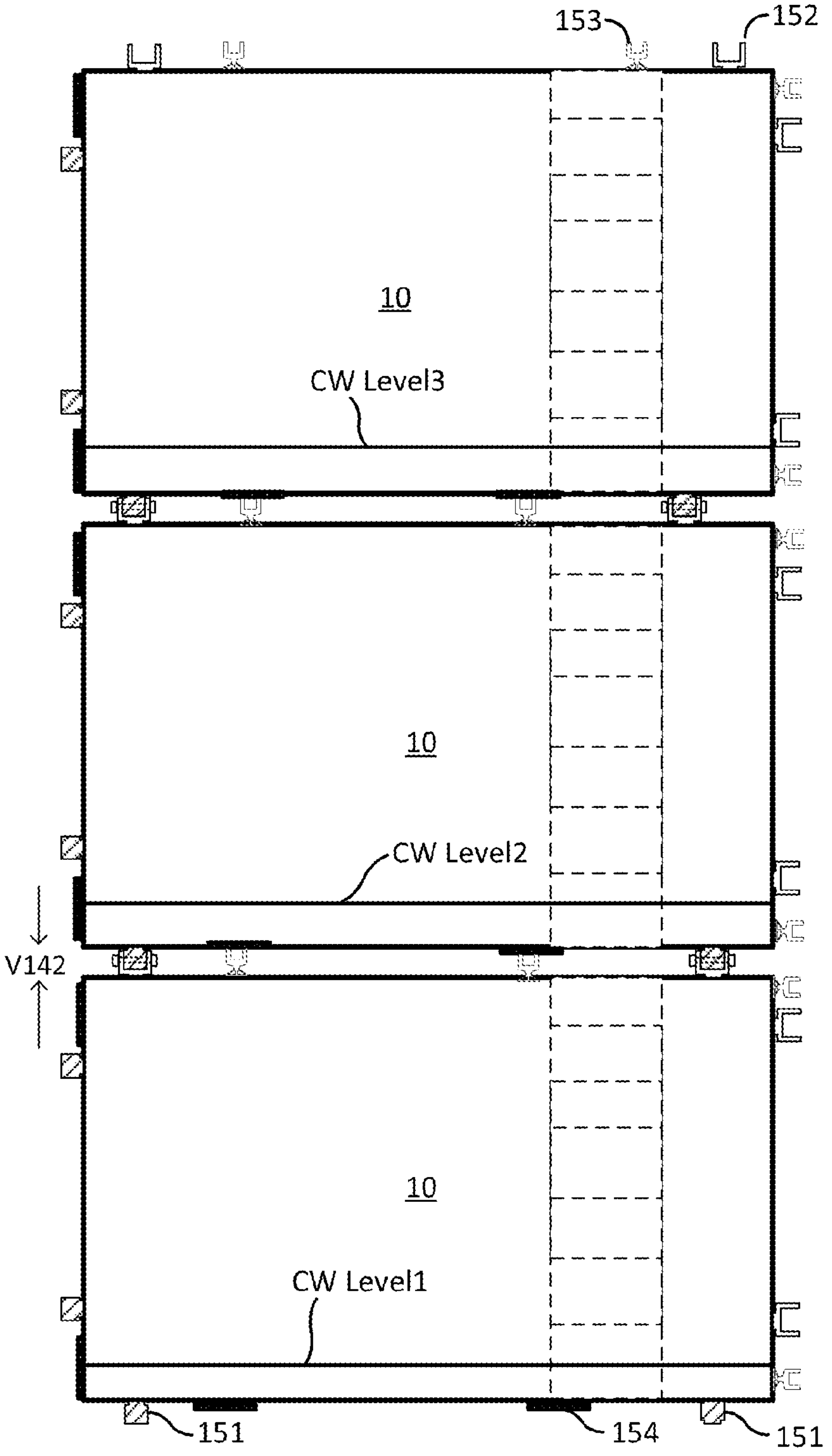

FIG. 11D illustrates a further embodiment showing additional adjustment features for adjusting the vertical and horizontal distances between adjacent preassembled display units. Additionally embodiments of the present invention may include height adjustment features such a jack bolt that may be used to adjust the vertical distance V142 between the adjusted preassembled display units 142. As an example, the height adjustment features may include a jack screw 153 whose height may be adjusted and a platform 154. In various embodiments, the vertical distance V142 between the adjusted preassembled display units 142 is about the same to the vertical distance between adjacent display panels of the plurality of display panels 50 within each preassembled display units 142. Therefore, once the preassembled display units 142 are stacked together, the separation between the adjacent preassembled display units 142 is visually indistinguishable. Such jacks may be added to the horizontal sides of the chassis 34 as well for the same reason, for example.

Figure 12A:
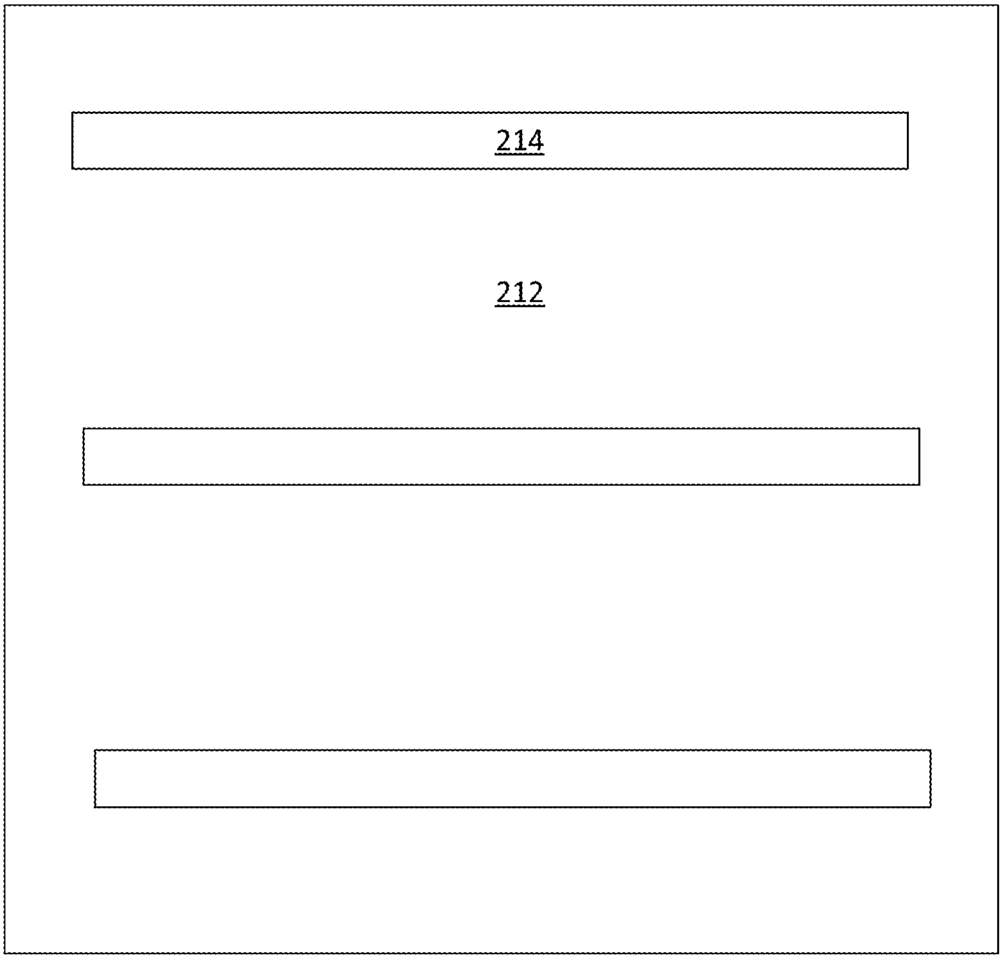
Figure 12B:
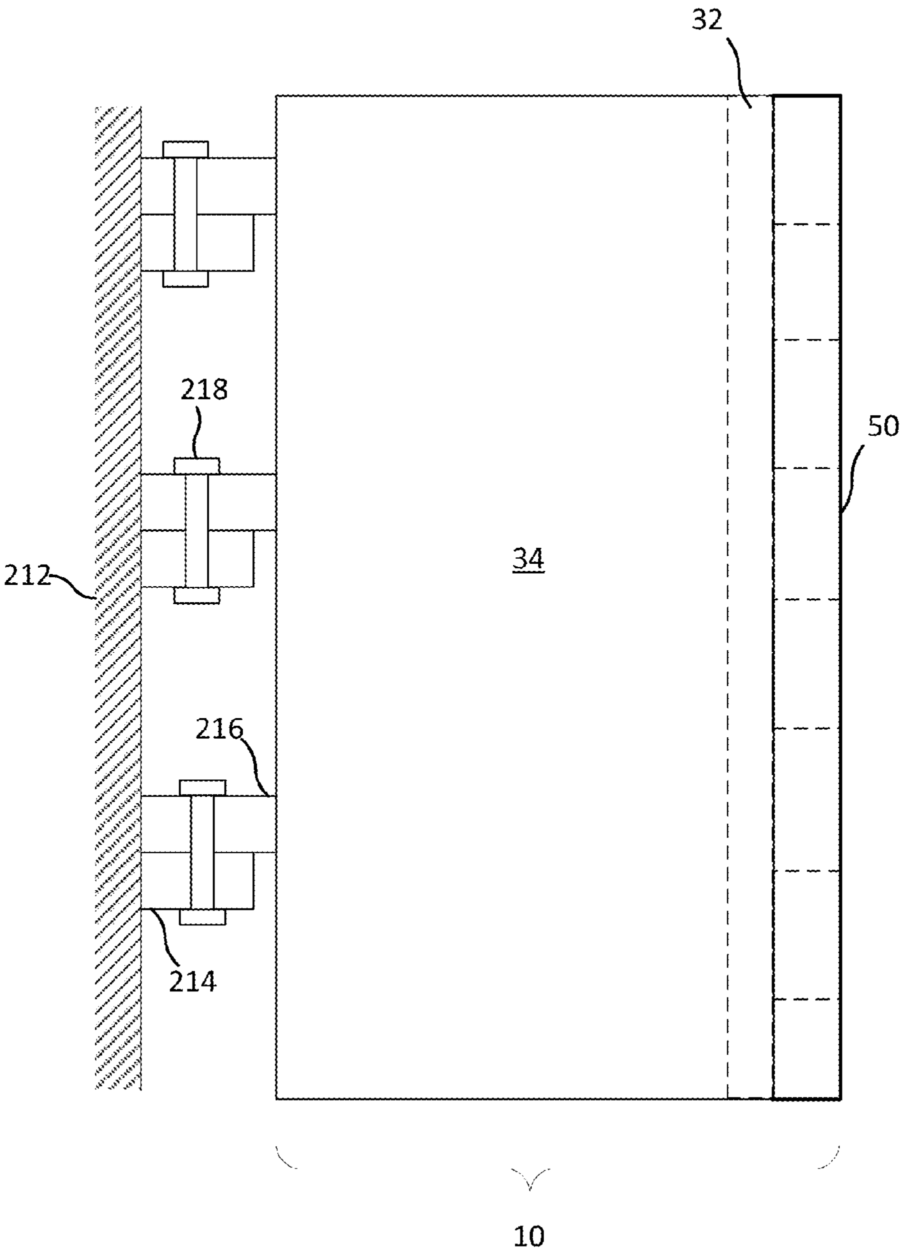
Figure 12C:
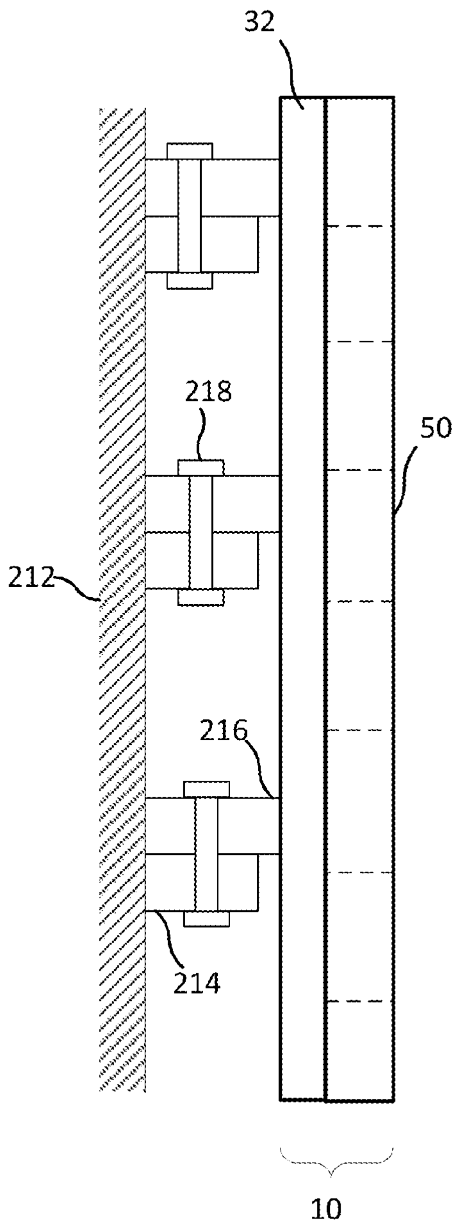

FIGS. 12A-12C illustrates an on-site wall mounting of a preassembled display unit in accordance with an embodiment of the present invention. FIG. 12A illustrates a front view of the mounting wall and FIGS. 12B and 12C illustrate side views illustrating the mounting wall and the mounted preassembled display unit.

Referring now to FIG. 12A, the mounting wall 212 may be a feature attached to a building or other surface on which the display unit is to be finished. The mounting wall 212 may be installed first in anticipation of the subsequent installation of preassembled display unit. The mounting wall 212 includes one or more mounting points 214 or stringers. The mounting points 214 may be attached to the mounting wall 212 if necessary at the time of the installation.

Referring to FIG. 12B, in one embodiment, the preassembled mounting display unit 142 includes a cage 34 with vertical beams 32 on which the plurality of display panels 50 are mounted. The preassembled mounting display unit 142 is mounted onto the mounting wall 212 as illustrated in FIG. 12B. In one embodiment, the preassembled mounting display unit 142 is positioned so that the mounting fixtures 216 of the preassembled mounting display unit 142 are mechanically supported by the mounting points 214 or stringers. After correctly aligning the mounting fixtures 216 with the mounting points 214, anchors 218 may be used to permanently secure the mounting fixtures 216 to the mounting points 214.

FIG. 12C illustrates a further embodiment in which the plurality of beams is directly mounted to the mounting wall. In this embodiment, a catwalk and the accompanying chassis may be skipped and the preassembled mounting display unit 142 comprising the vertical beams 32 may be directly mounted onto the mounting wall 212.

Figure 13A:
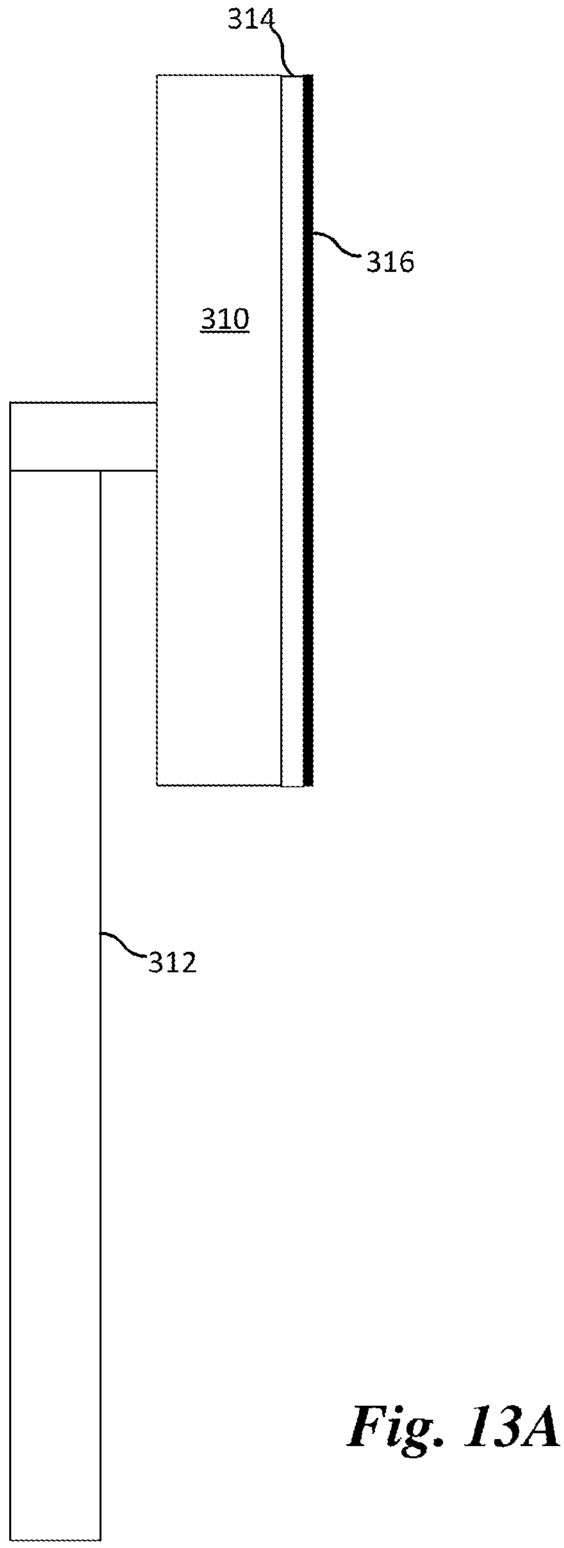
FIGS. 13A and 13B illustrates a method of retrofitting a preexisting billboard in accordance with an embodiment of the present invention.
Figure 13B:
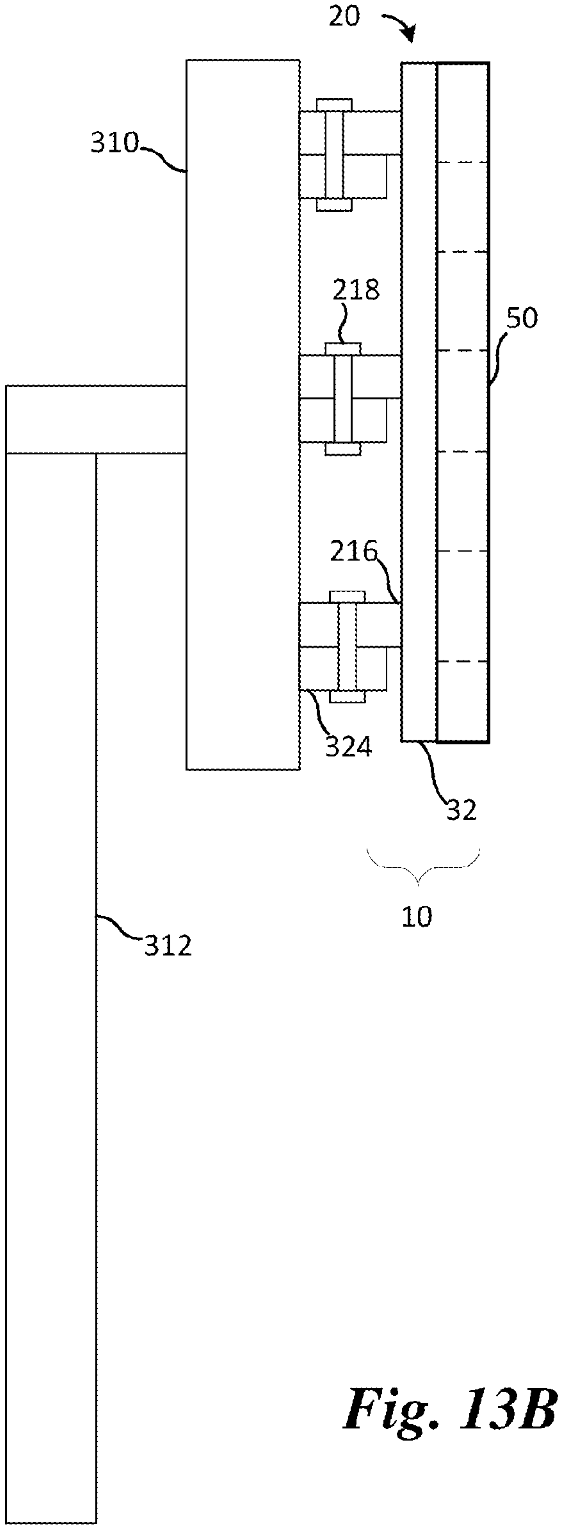

FIGS. 13A and 13B illustrates a method of retrofitting a preexisting billboard in accordance with an embodiment of the present invention.

In various embodiments, preexisting displays, such as a billboard, may be removed and fitted with one or more of the preassembled display units. The preexisting billboard to be retrofitted may be non-electronic billboard and may also include mercury or fluorescent lighting. Embodiments of the present invention may be applied to different types of billboard including wooden billboard with wooden supports with dimensional lumber as the secondary support (A frame). Embodiments may be applied to retrofit a preexisting steel A-frame billboard comprising angle iron or steel supports with metal framing. In one or more embodiments, a preexisting billboard may include a steel pole with an I-beam or equivalent as the primary support. In another embodiment, the preexisting billboard may include tubular steel support of various circumferences and tubular steel framing as examples. The preexisting billboard may also include a catwalk in some embodiments.

Referring to FIG. 13A, a preexisting billboard may include a central pole 312 supporting the billboard. The billboard may include a billboard frame 310, which may be different depending on the type of the billboard. In various embodiments, the billboard frame 310 may include a catwalk.

The billboard may include a solid plywood layer 314 over which a canvas 316 is mounted. The solid plywood layer 314 may have been mounted on the billboard frame 310. The canvas 316 and the solid plywood layer 314 are removed prior to mounting the preassembled display unit 10 in FIG. 13B.

In various embodiments, if the billboard frame 310 is retained, then the preassembled display unit 10 may not need any additional catwalk as the billboard frame 310 already includes a catwalk. In such embodiments, the preassembled display unit 10 includes only a frame 20 (without the chassis) on which the plurality of display panels 50 have been mounted. Embodiments of the present invention may be applied to billboard of different configurations such as single face, back-to-back, or V-build, side-by-side, stacked, and tri-build configurations.

Referring to FIG. 13B, the preassembled display unit 10 comprising the frame 20 and the display panels 50 is mounted onto the mounting features 324 of the billboard frame 310. If necessary, additional beams such as I-beams may be added to form stringers. Advantageously, the preassembled display unit 10 is mounted quickly without extensive labor because of the modular nature of the preassembled display unit 10, which only requires mechanically hoisting the preassembled display unit 10 and properly aligning the preassembled display unit 10 with the mechanical mounting features 324 of the preexisting billboard frame 310. The installation is completed by mechanically securing the preassembled display unit 10, e.g., using screws or anchors 218, to the preexisting billboard frame 310.

Figure 13C:
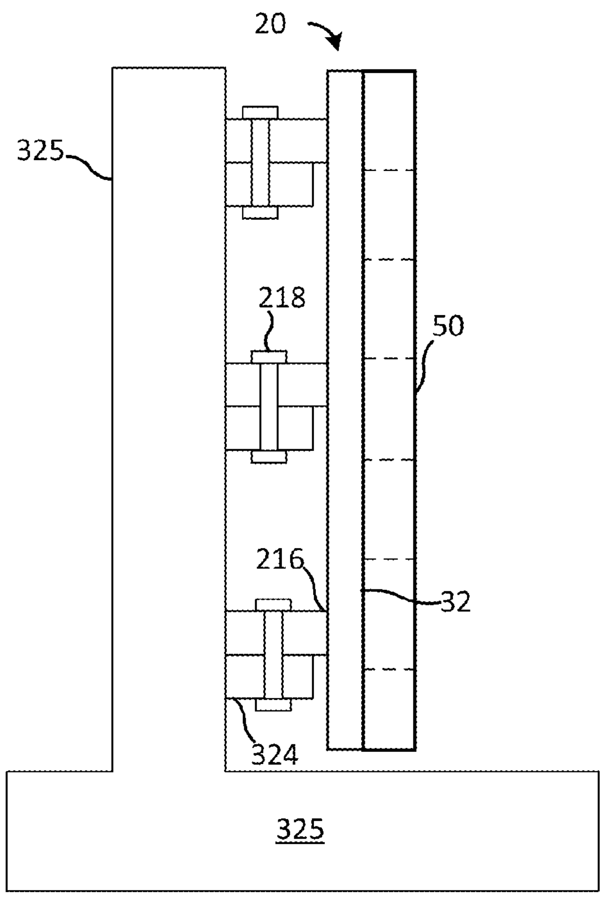
FIG. 13C illustrates an alternative embodiment of the present invention showing a stand mount.

FIG. 13C illustrates an alternative embodiment of the present invention showing a stand mount. In this embodiment, because of the light weight of the preassembled display unit 10, the preassembled display unit 10 may be mounted on a stand mount 325, for example, to be displayed from a shop window. The actual mounting positions and mechanism may be suitably adjusted according to the need (e.g., display aesthetics), the number of display units, and others.

After the mechanical connection is completed, the electrical connection is made. However, in some embodiments, the only electrical connection to be made is the connection of the main power and data cable (if any) to the receiver box. This is because all the connections between the different panels and the receiver box may have been preassembled at the factory before the preassembled display unit 10 was shipped to the site of the billboard. In other embodiments, the receiver box is connected to the input cable to each of the plurality of display units. For example, the receiver box is connected to the first display unit and the remaining display units in the same row are daisy chain coupled. However, in both embodiments, the receiver box may already be mechanically secured while building the preassembled display unit.

Further, because of the lower power consumed by the preassembled display unit, only a single phase power is needed advantageously even for very large displays. Conventionally, three phase power is needed for large display because of the large power consumed by such units.

Figure 14A:
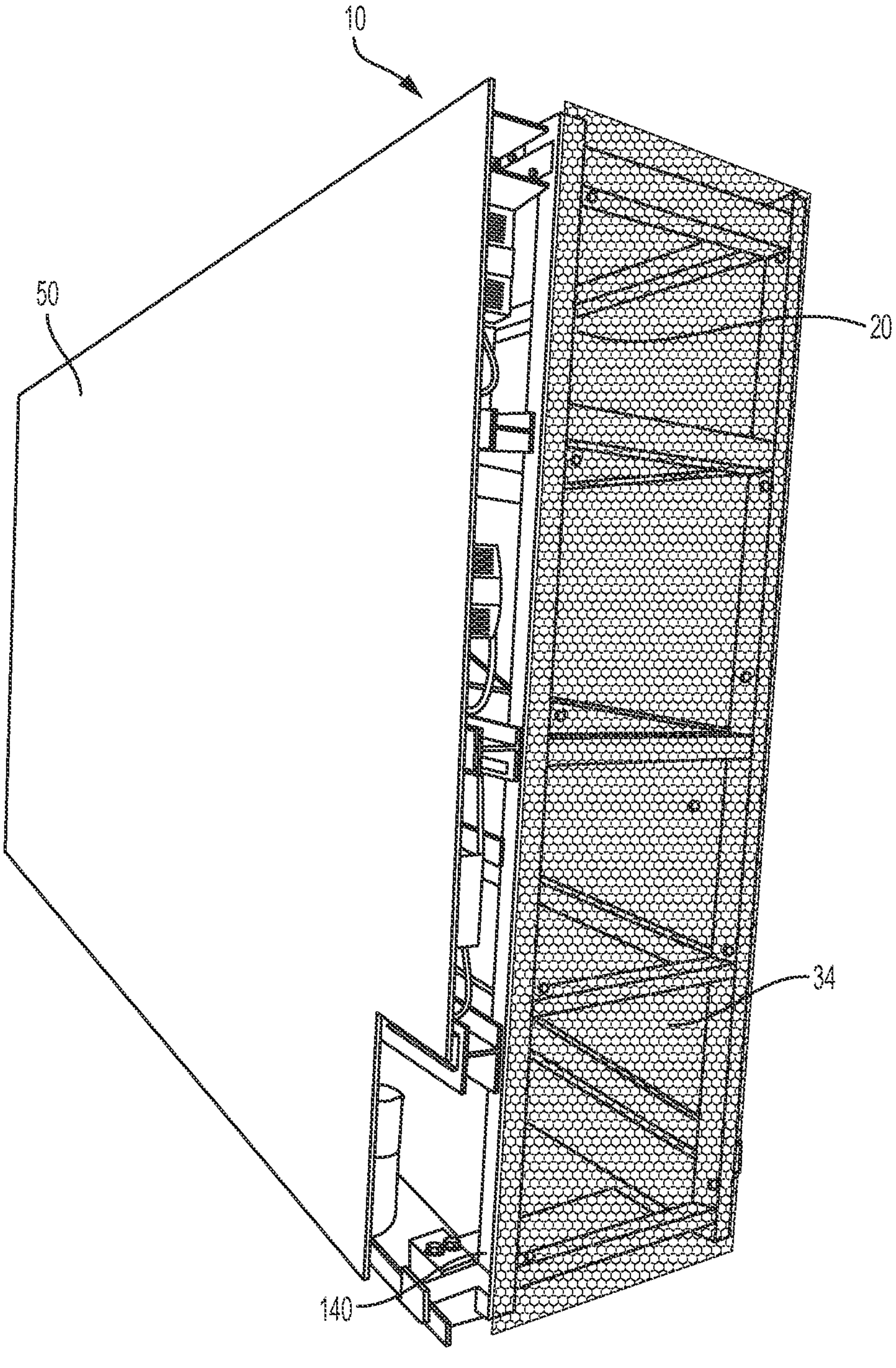

FIGS. 14A-14G illustrate specific examples of a preassembled display unit 10 including the frame 20. As shown in FIG. 14A, the modular preassembled display unit 10 includes a number of LED display panels 50 mounted to frame 20. One of the display panels has been removed in the lower corner to illustrate the modular nature of the display. As a consequence, and additionally, the easy access to the LED display panels 50 from the rear of the preassembled display unit 10 enables hot-swapping. In other words, one or more of the display panels 50 may be removed and replaced without powering down the display system during operation. This enables repair and replacement of any of the display panel without powering down the whole display unit.

Figure 14B:
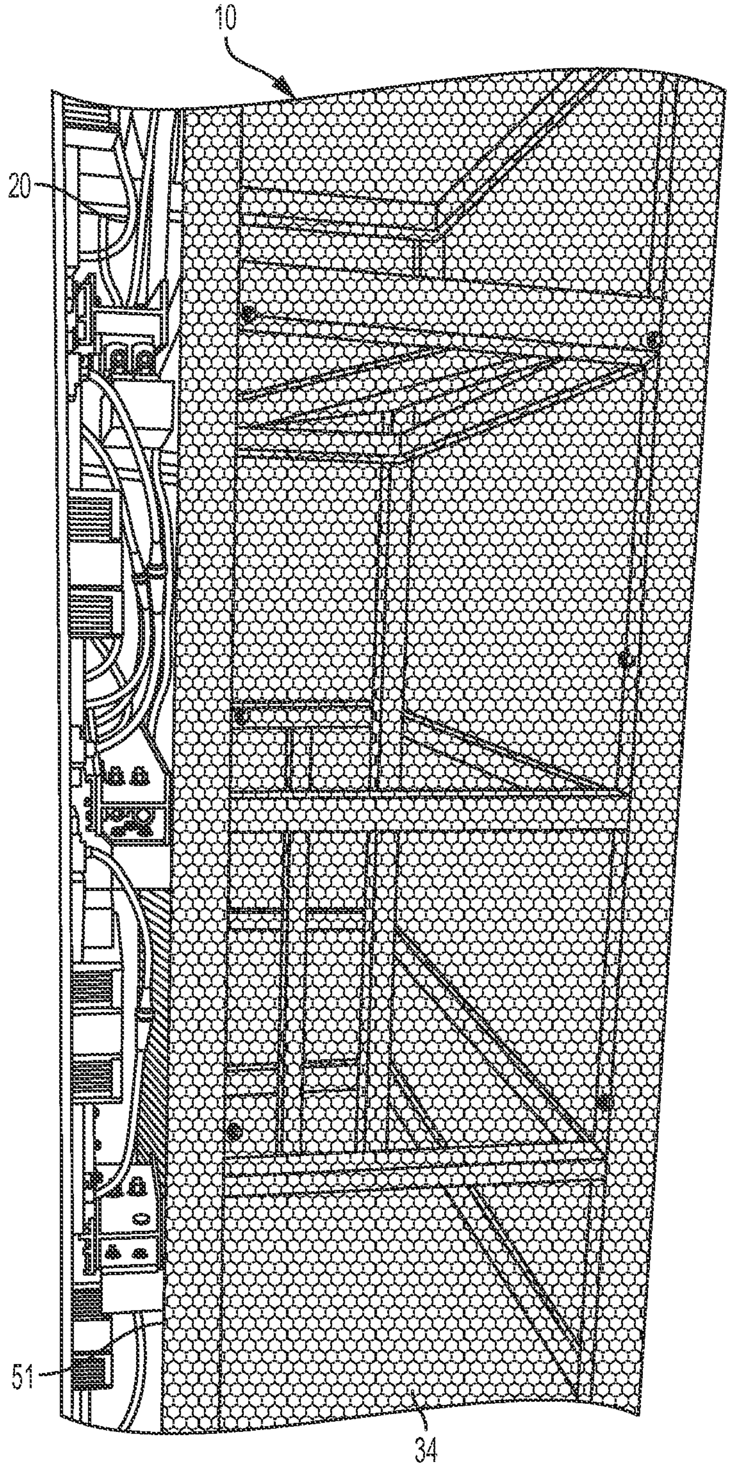
Figure 14C:
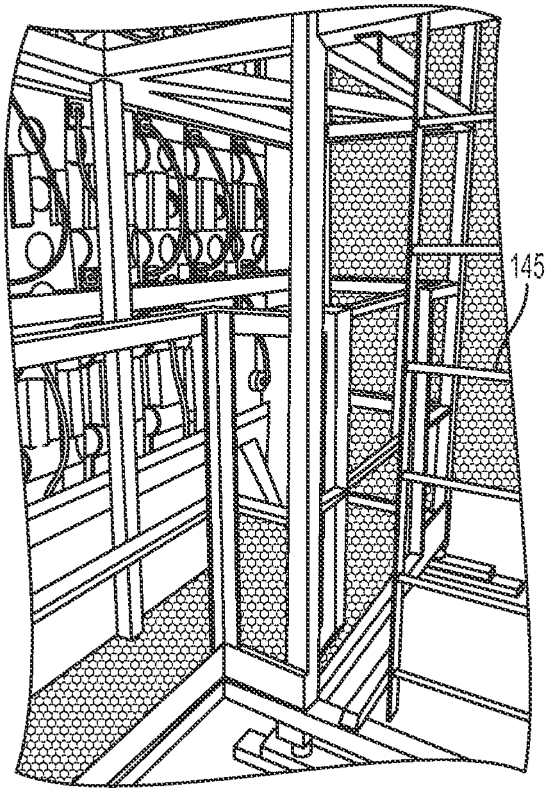
Figure 14D:
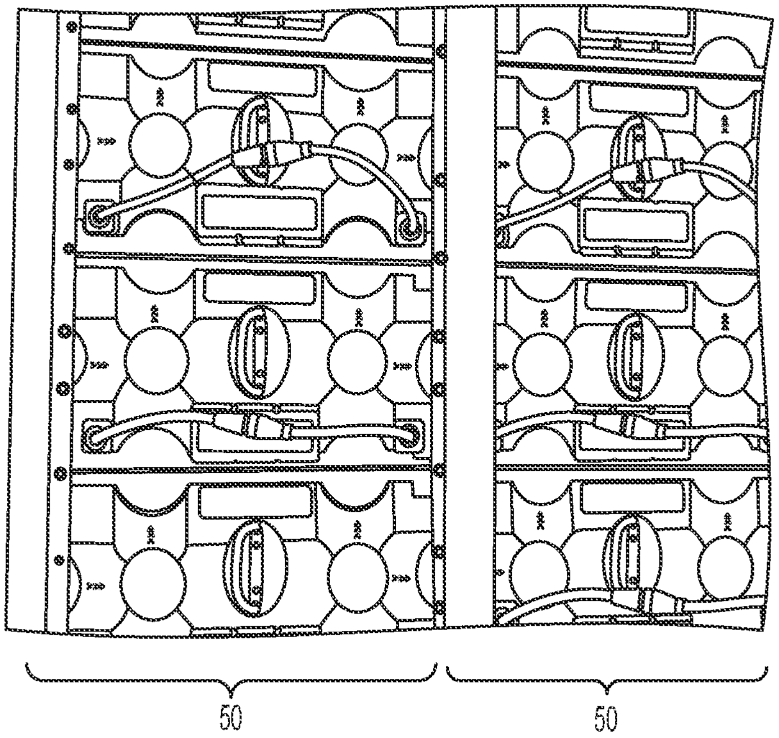

A side view of the display system is shown in FIG. 14B and back views are shown in FIGS. 14C and 14D. FIG. 14B also illustrates the absence of additional protective cabinetry, for example, the back side 51 of the display panels 50 remains exposed.

Figure 14E:
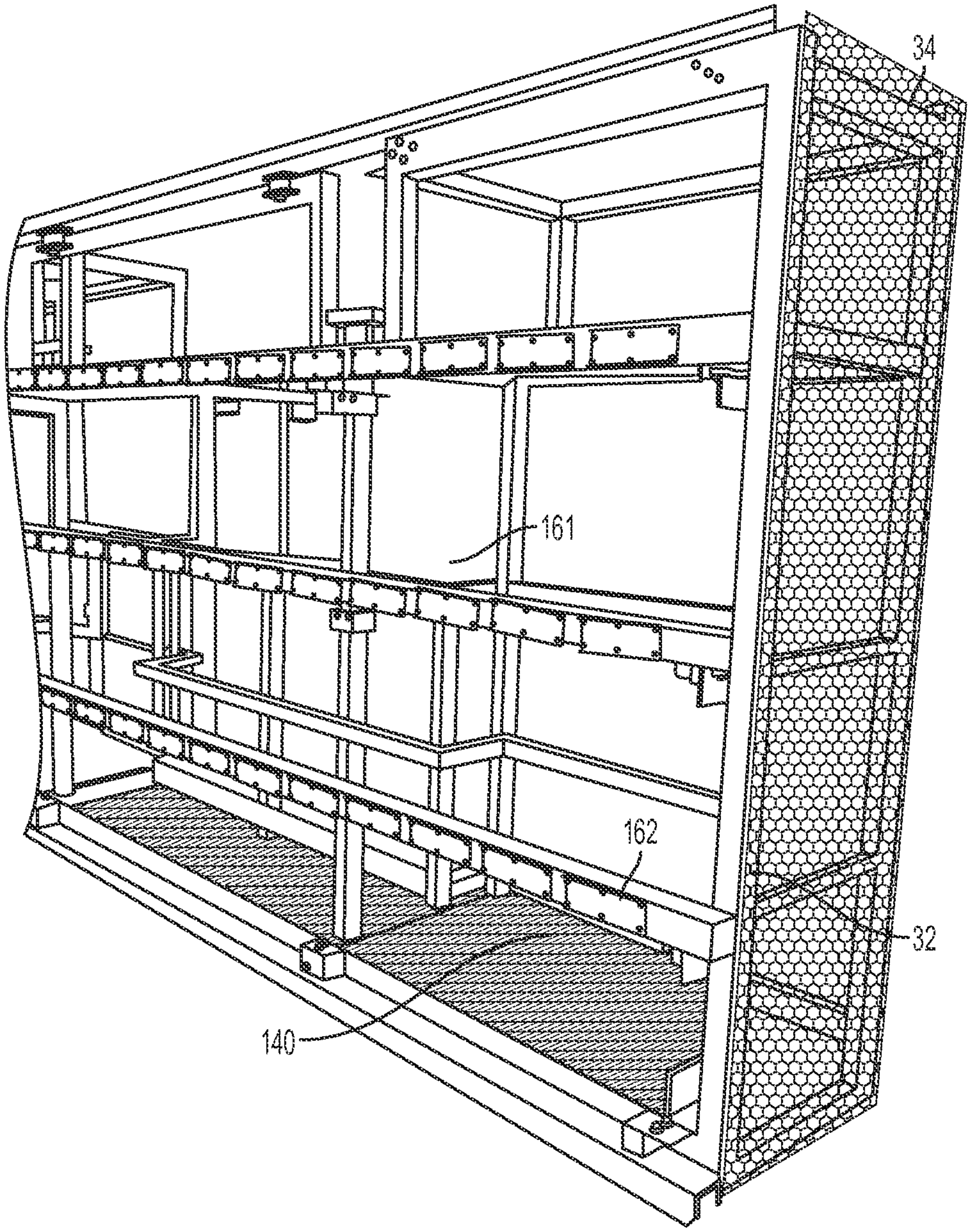
Figure 14F:
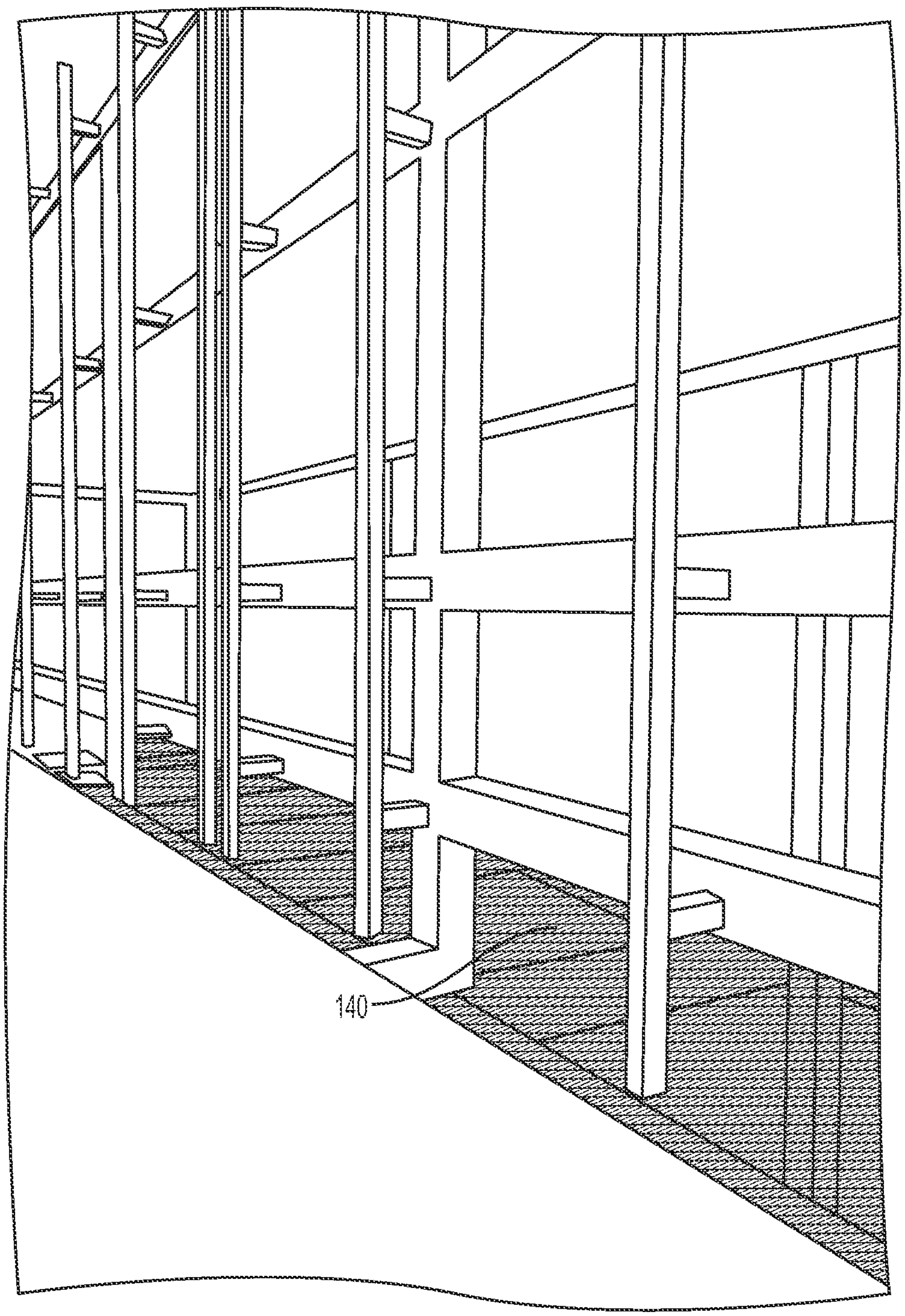
Figure 14G:
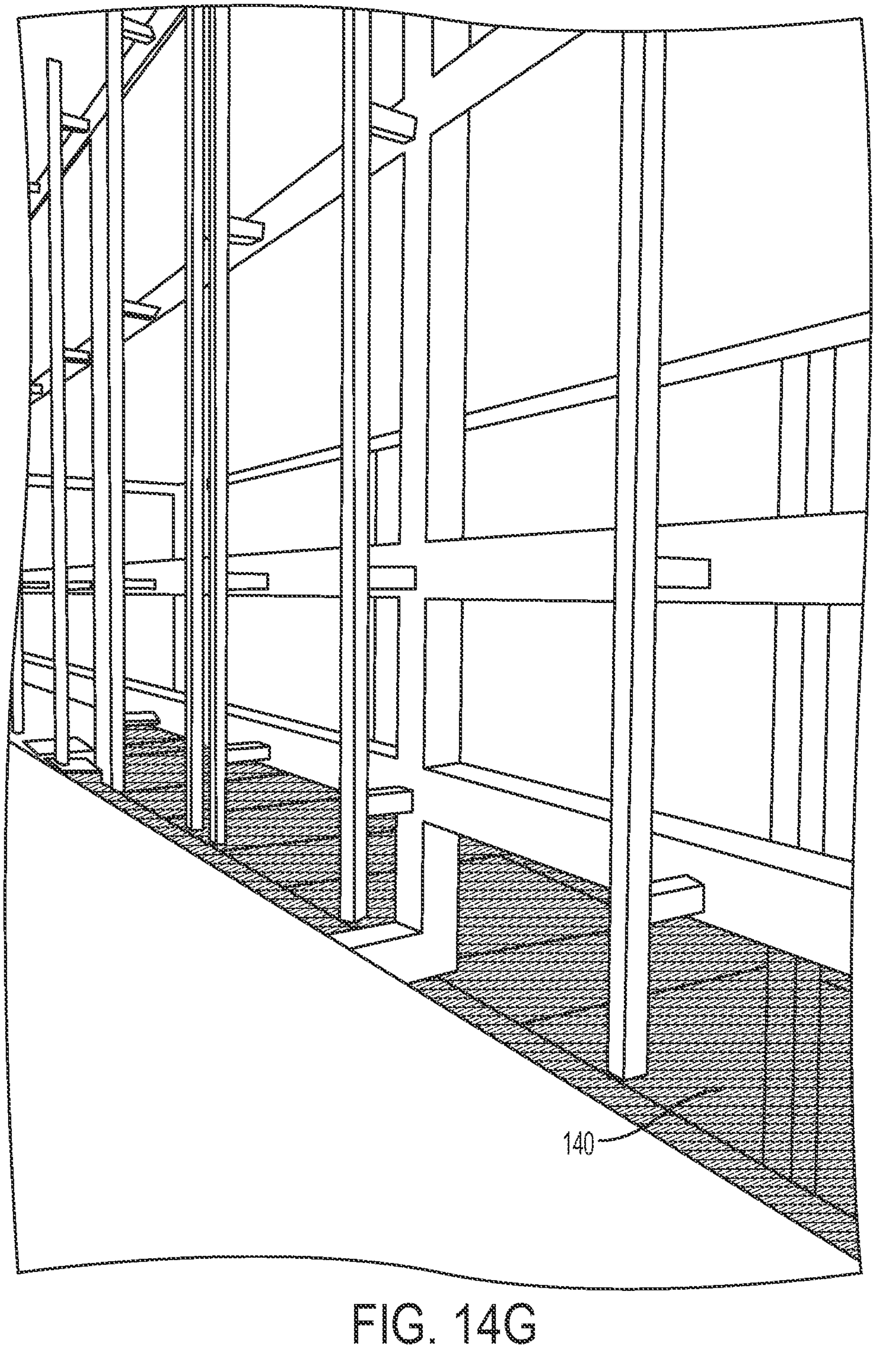

In this particular example, access is provided to the back of the modular display through a cage 34 that includes an enclosed catwalk 140. The catwalk is illustrated in the views without the mounted display panels as illustrated in FIG. 14E-14G. Since the display system 100 is generally highly elevated, a ladder 145 (see FIG. 14C) provides access to the catwalk 140. In the back view of FIG. 14D, the cables of display panels are shown to be locked within itself for safe transportation.

FIG. 14E illustrates the cage 34 without the display panels 50. In this embodiment, the beams of the cage 34 forming an outer frame are bigger than the interior beams. In this case, the interior beams 161 are aligned in a plane outside those of the plurality of beams 32. Upon installation, the plates 162 may be rotated by 90° and fasten to the display panels. Other views of the frame are shown in FIGS. 14F and 14G.

Additionally, in one or more embodiments, the assembled display may have the size of the final on-site display. For example, the assembled display structure at the factory may have the size of a standard billboard (12'×24'). In such embodiments, as described previously, the on-site installation is minimal.

FIGS. 15A-15E illustrates different projection views of a preassembled display system in accordance with an embodiment of the present invention.

Figure 15A:
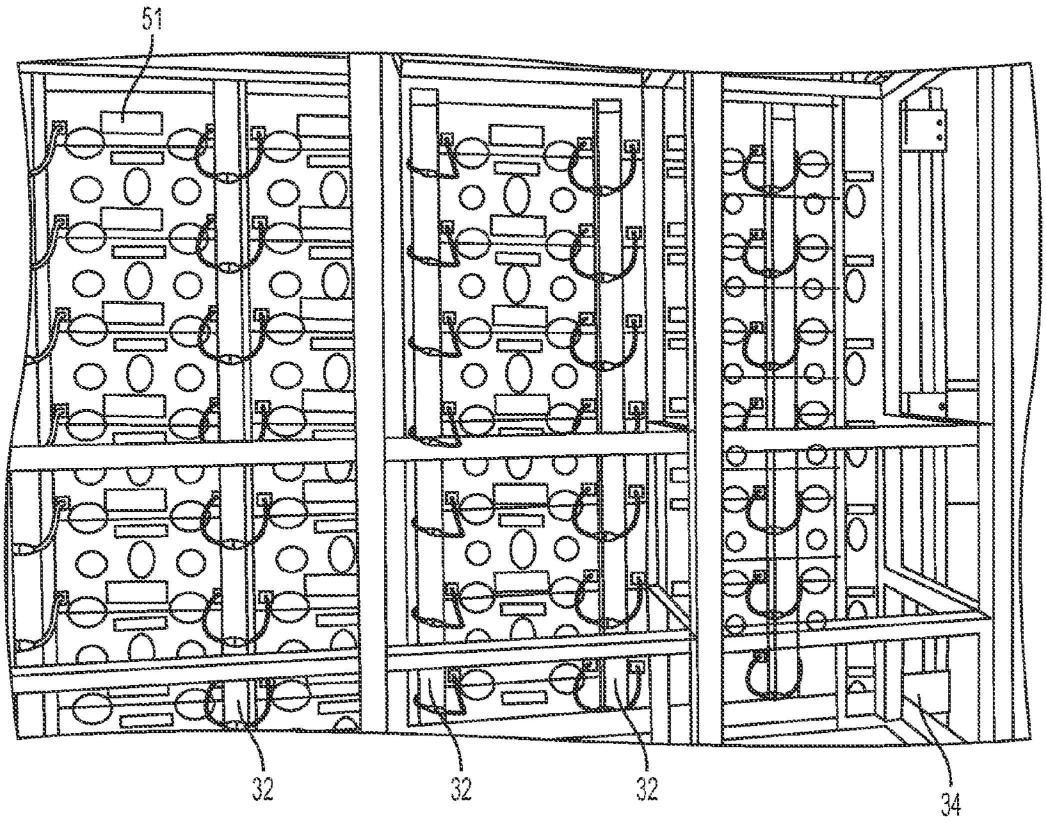

FIG. 15A illustrates a preassembled display system in accordance with an embodiment of the present invention.

The preassembled display system includes a plurality of display panels 50 coupled to the frame 20 that includes vertical beams 32 attached to a cage 34. As in prior examples, the back side 51 of the display panels 50 remains exposed. Similarly, as previously discussed, for each row, a display panel 50 at a first end receives an input data connection from a data source and has an output data connection to a next display panel in the row.

Figure 15B:
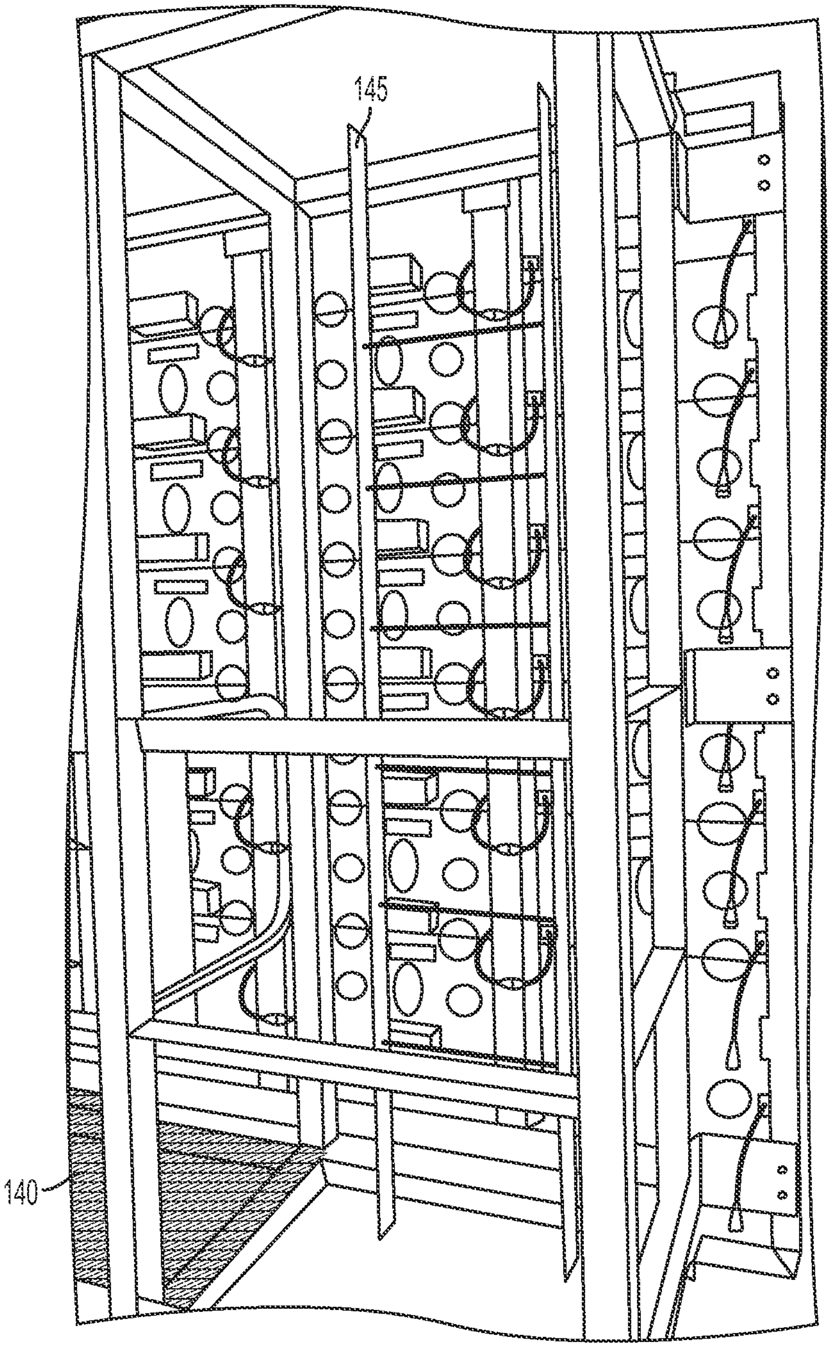

The backside 51 of the display system is accessible from the backside of the display panels 50 from the cage 34, which may include a catwalk (shown in other figures, e.g., FIG. 15B). Consequently, replacing one or more display panels 50 after the initial installation is easier. Thus, a defective display panel can be removed completely from the back side 51 of the display system. Advantageously, no additional front side access is necessary. Further, the display panels are cooled efficiently because they are exposed to the atmosphere and not enclosed within a cabinet as in conventional designs.

FIG. 15B illustrates a magnified view of the preassembled display system illustrated in FIG. 15A in accordance with an embodiment of the present invention.

As described previously, a ladder 145 provides easy access to the various levels of the display system. In this illustrated example, the final display system comprises a plurality of preassembled display units stacked over one another. Thus, the ladder 145 provides access to the higher levels.

Figure 15C:
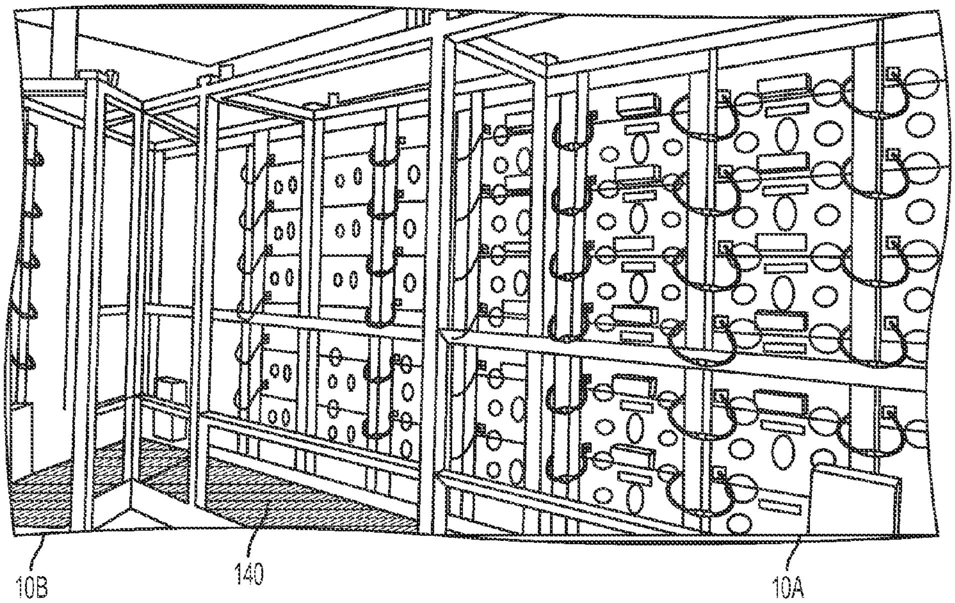

FIG. 15C illustrates a preassembled display system including a non-linear shape in accordance with an embodiment of the present invention.

In various embodiments, the preassembled display system may be constructed according to the design requirements of the mounting wall, for example, shape of the building wall. As illustrated in FIG. 15C, the preassembled display unit 10 includes a first portion 142A and a second portion 142B at an angle with the first portion.

Figure 15D:
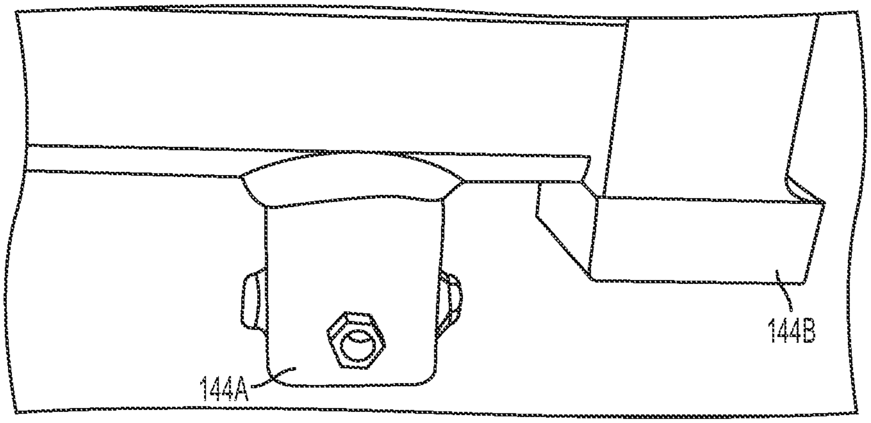

FIG. 15D illustrates a magnified portion of the base of a preassembled display system including a non-linear shape in accordance with an embodiment of the present invention.

In various embodiments, the preassembled display unit 10 may include alignment and mechanical features for stacking preassembled display units 142 over each other. Referring to FIG. 15D, the preassembled display unit 10 includes a first mounting feature 144A and a second mounting feature 144B for attaching to underlying chassis of the underlying preassembled display unit 10. The second mounting feature 144B may be part of an alignment mechanism such as for using a jack bolt and will be described below in subsequent figures.

Figure 15E:
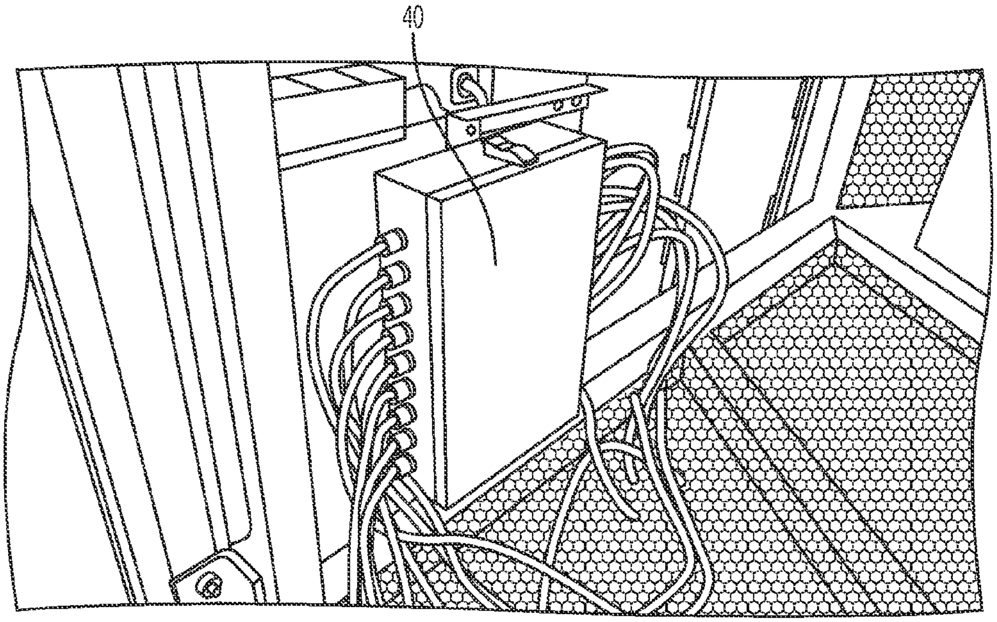

FIG. 15E illustrates a preassembled display unit 10 in which a receiver box 40 is installed. Although the receiver box 40 is installed, it may not be connected to the plurality of display panels. Rather, the cables from the receiver box 40 may be wrapped up for secure transportation. At the installation site, the cables from the receiver box 40 may be connected to cables of the plurality of displays.

Figure 16:
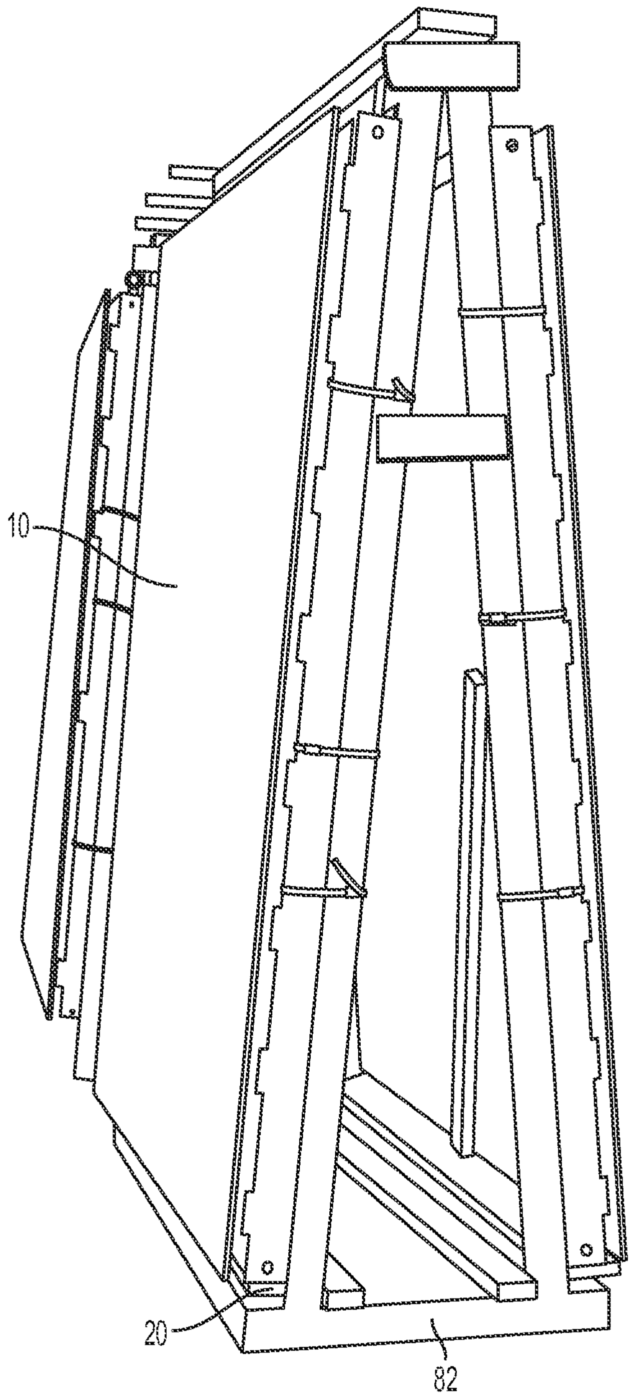
FIG. 16 illustrates an assembled multi-panel display that is ready for shipment.

FIG. 16 is an illustration of two assembled displays that are ready for shipment. In this embodiment, the preassembled display unit 10 may not include a chassis because the display unit is directly mounted on a billboard with a preexisting catwalk. Alternatively, the display unit may be mounted on a stand such as a window stand, e.g., in a window display. These displays can be quite large, for example much larger than a 14×48 panel display. In some cases, a single display system is shipped as a series of sub-assemblies, e.g., as shown in the figure, and then assembled into a full display on location. At the installation site, the preassembled display units 142 may be removed from the shipping mount and raised and mounted onto a mounting wall or window stand.

FIGS. 17A-17F illustrates different projection views of a preassembled display system illustrating the features used for stacking and alignment in accordance with an embodiment of the present invention.

Figure 17A:
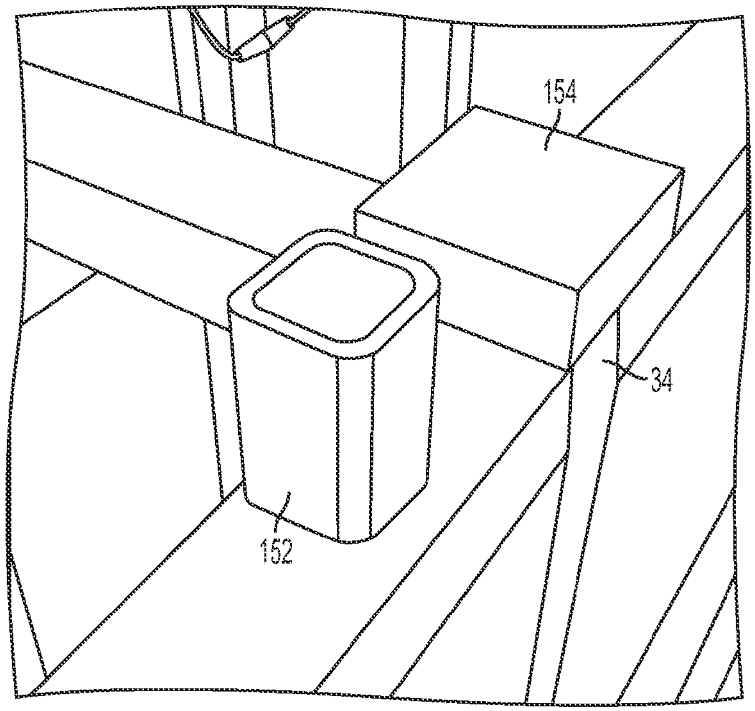

FIG. 17A illustrates a preassembled display system in accordance with an embodiment of the present invention.

As illustrated in FIG. 17A in one illustrated embodiment, one surface of a cage 34 includes a second joining feature 152 and a platform 154. In one embodiment, the second joining feature 152 is a hollow square tube configured to receive another square tube or square block. The platform 154 provides a solid base to receive a head of a jack screw and thus may be used to lower an overlying chassis, which may be mounted subsequently over the illustrated cage 34.

Figure 17B:
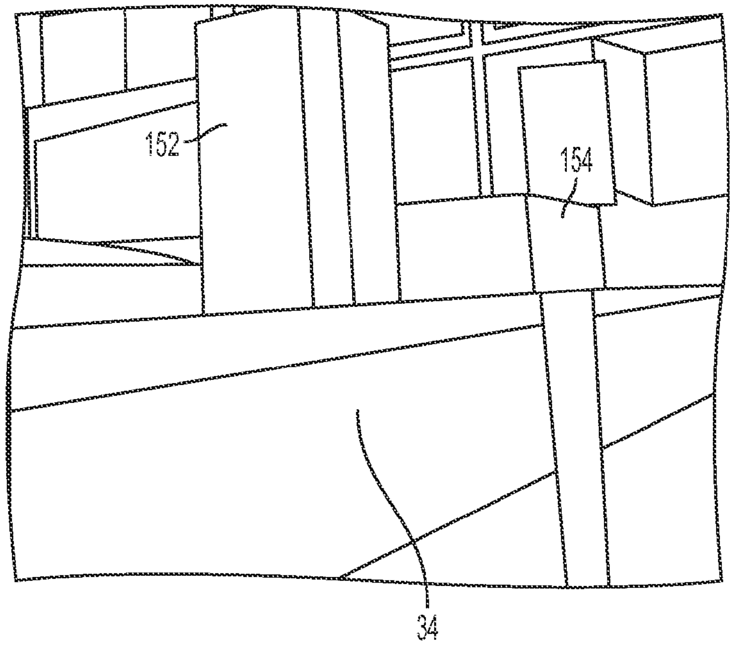
Figure 17C:
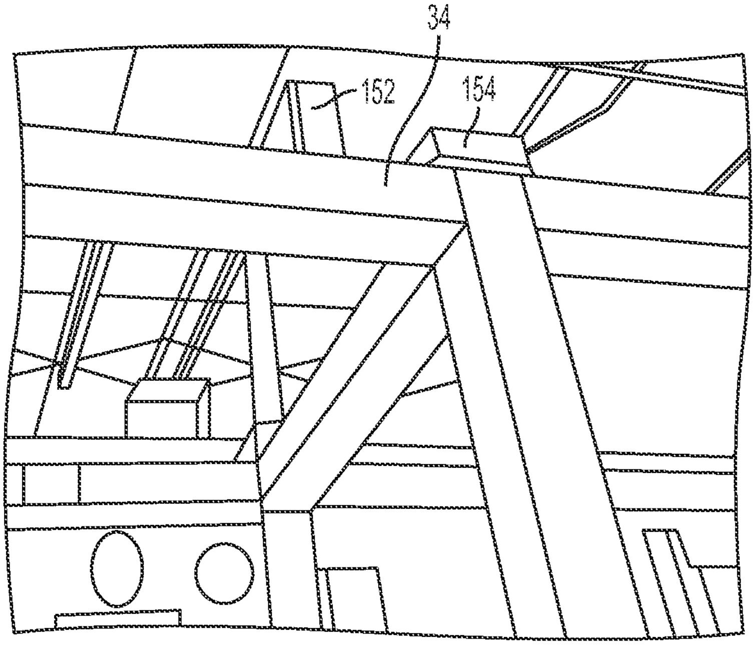

FIG. 17B illustrates another magnified projection view of the cage 34 showing the platform 154 and the second joining feature 152. FIG. 17C illustrates a side projection view of the cage 34 showing the platform 154 and the second joining feature 152.

Figure 17D:
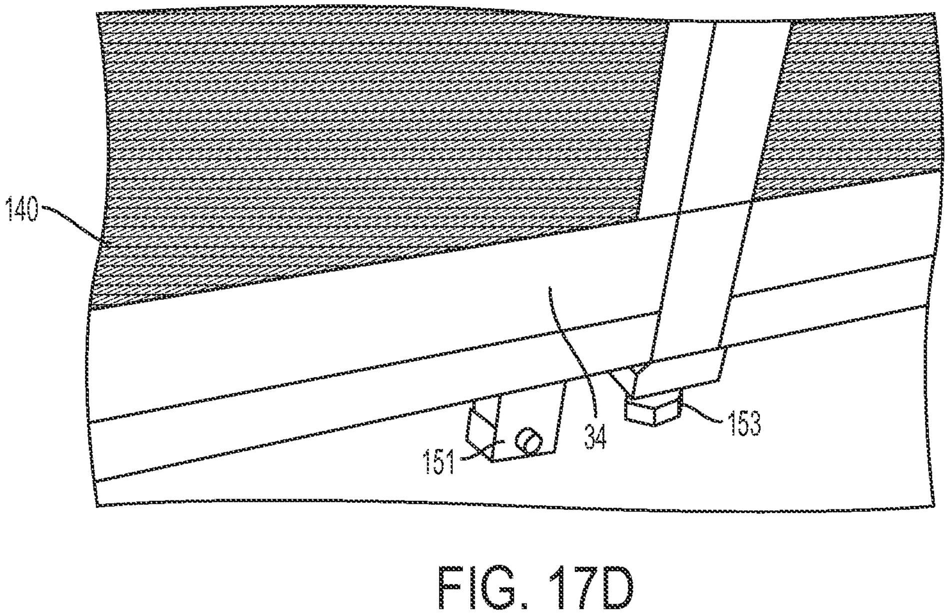

FIG. 17D illustrates a magnified projection view of another side of a cage showing a jack screw and a first joining feature.

As illustrated in FIG. 17D, the other side of the cage may include a first joining feature 151 which may be a solid square block or square tube having a diameter smaller than the second joining feature 152. A jack screw 153 may be used to raise or lower the cage 34.

Figure 17E:
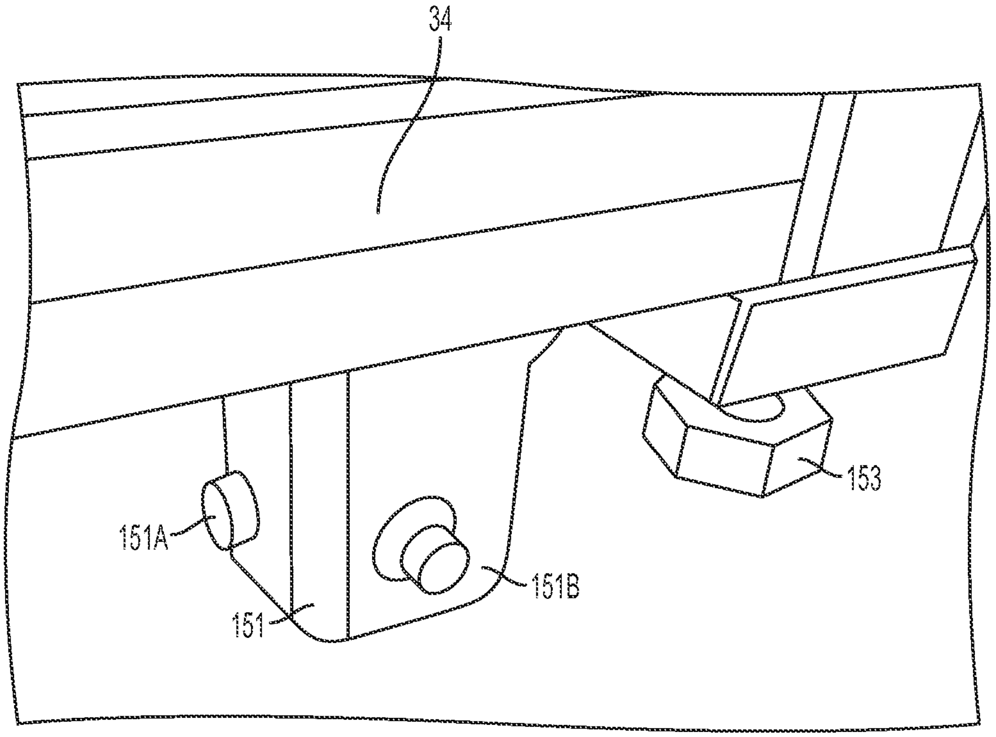

FIG. 17E illustrates another magnified projection view showing the first joining feature 151 and the jack screw 153. Thus, during subsequent installation, the first joining feature 151 is placed into an underlying second joining feature of an underlying cage and then secured using a securing bolt (not shown but, for example, see FIG. 11B).

The first joining feature 151 may include a first hole 151A and a perpendicular second hole 151B so that the first joining feature 151 may be secured to a second joining feature 152 of an underlying cage from any side.

Figure 17F:
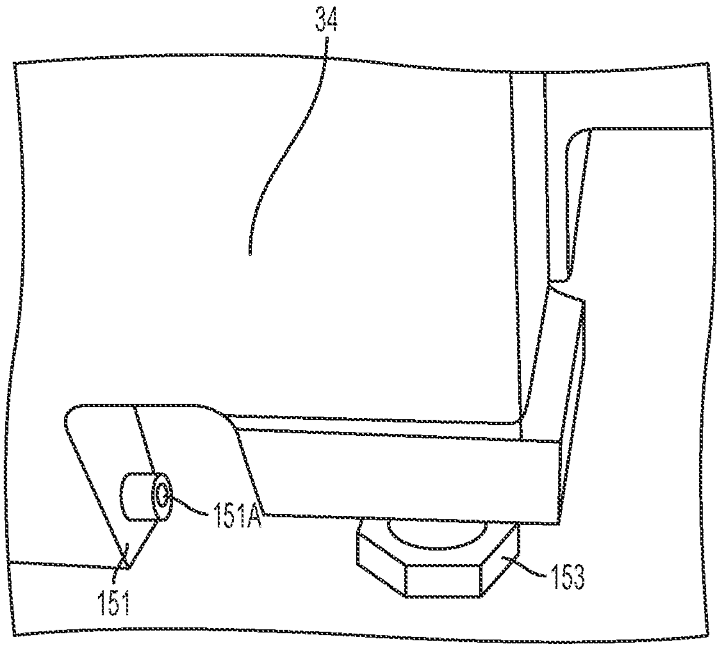

FIG. 17F illustrates a magnified back side projection view showing the first joining feature 151 and the jack screw 153. The back side view (along with FIG. 17E) also shows that the first hole 151A is a through hole extending completely through the first joining feature 151.

In various embodiments, the assembled multi-panel display system includes no cabinets. The assembled multi-panel display system is cooled passively and includes no air conditioning or fans.

Figure 18:
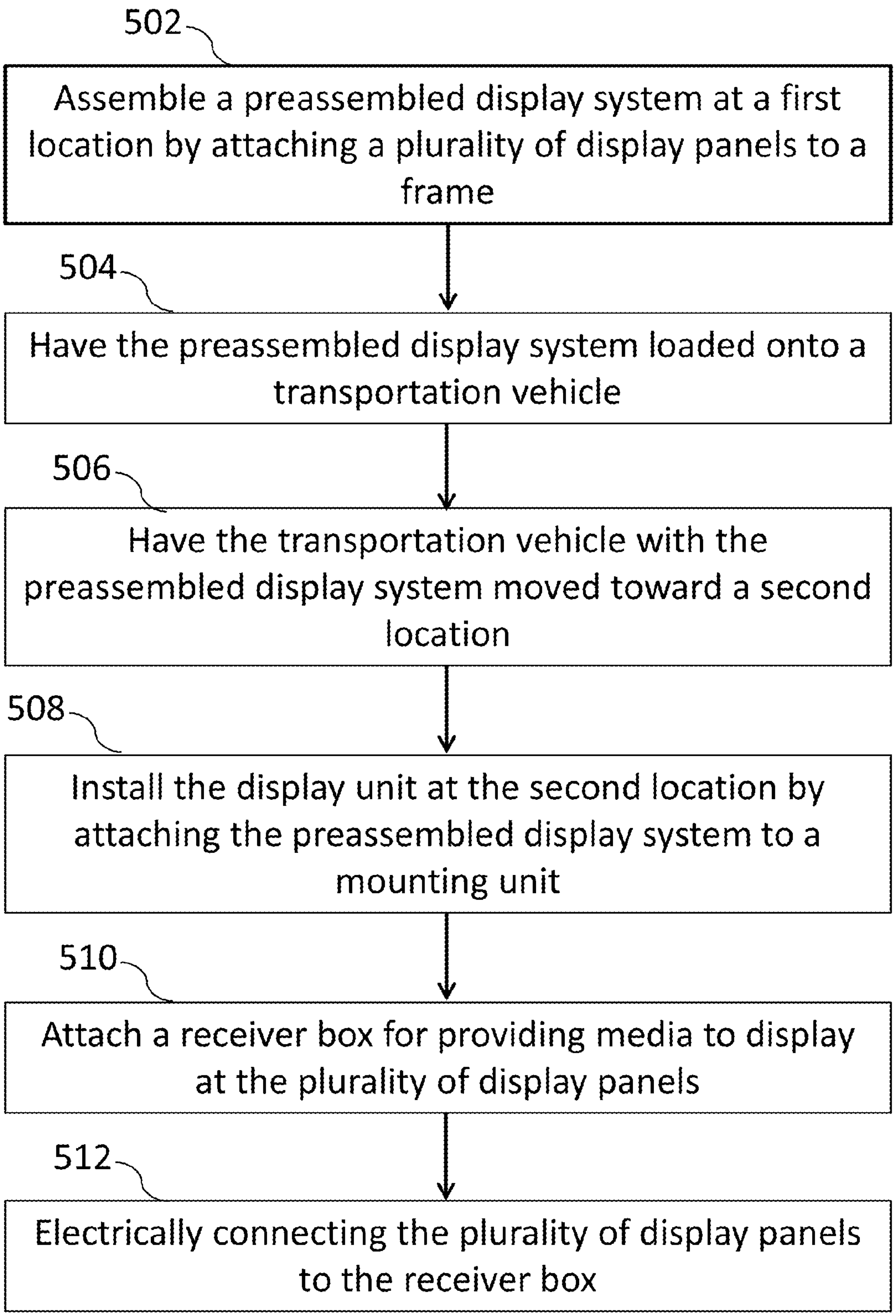
FIG. 18 illustrates a method of installing the display unit, which may be either a billboard or mounted directly on a wall of a building.

FIG. 18 illustrates a method of installing the display unit, which may be either a billboard or mounted directly on a wall of a building. A preassembled display system is assembled at a first location by attaching a plurality of display panels to a frame (box 502). In various embodiments, the preassembled display system may be at least 6 ft. long, for example, may be at least 6 ft.×12 ft. in one embodiment. The first location may be assembling facility or a warehouse in various embodiments. The preassembled display system is loaded onto a transportation vehicle (box 504). For example, the preassembled display system may be loaded onto to a shipping truck or rail cart. In various embodiments, multiple shipping carriers may be used. Next, the preassembled display system is moved to a second located in a transportation vehicle (box 506). The second location may be the final location at which the display system is to be set up. The display unit is installed at the second location by attaching the preassembled display system to a mounting unit (box 508). A preexisting display may be removed before installing the display unit at the second location. The attaching may be performed by lifting up the preassembled display system as a single unit to the mounting unit.

A receiver box for providing media to display at the plurality of display panels is attached (box 510). In various embodiments, the attaching may be performed at the first location and/or at the second location. The plurality of display panels are electrically connected to the receiver box (box 512). Again, the electrically connecting may be performed at the first location and/or at the second location.

Figure 19:
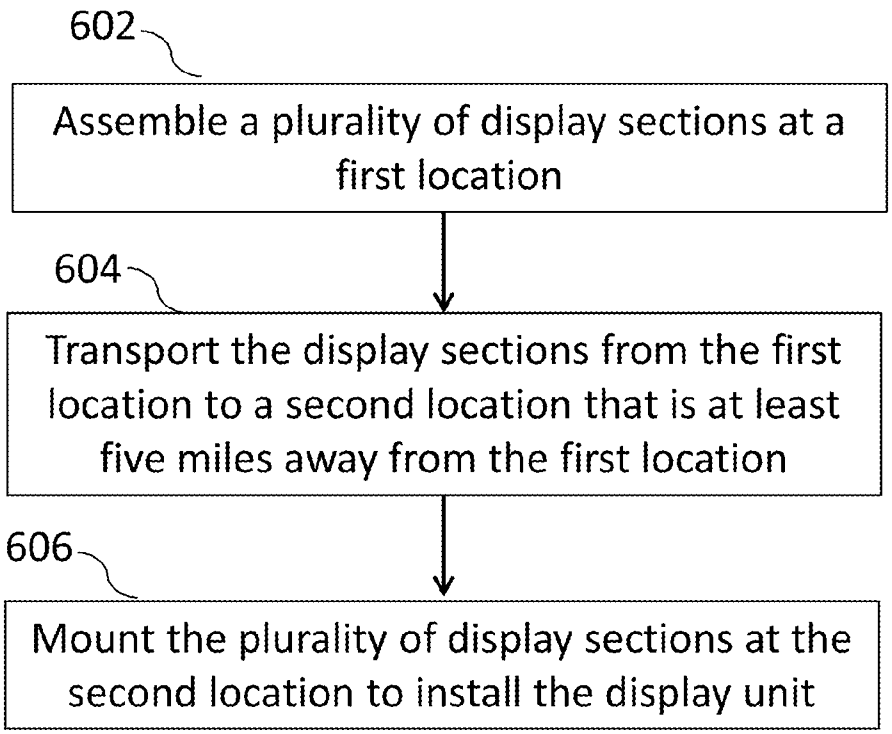
FIG. 19 illustrates a method of perming an installation of a display unit, which may be either a billboard or mounted directly on a wall of a building.

FIG. 19 illustrates a method of perming an installation of a display unit, which may be either a billboard or mounted directly on a wall of a building. Referring to FIG. 19, a plurality of display sections is assembled at a first location (602). Each display section includes a plurality of display panels mechanically attached to a frame. The assembled display sections are transported from the first location to a second location that is at least five miles away from the first location (box 604). The plurality of display sections is mounted at the second location to install the display unit (box 606). The display unit may be installed by attaching the frame of each display section to the frame of at least one other display section.

Although embodiments of the present invention have been described as being LED display panels, various embodiments of the present invention may also be applied to any type of display panel including organic display including passive-matrix or active-matrix displays, organic transistor based displays, micro-mirror displays, plasma display, liquid crystal display, surface-conduction electron-emitter display, field emission display, and others.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed:

1. A method of performing an installation of a display unit, the method comprising:

providing a plurality of display panels, wherein each of the plurality of display panels comprise:

a casing having a recess, wherein the casing comprises attachment points;

a printed circuit board disposed in the recess, a plurality of light emitting diodes (LEDs) attached to the printed circuit board, a driver circuit attached to the printed circuit board, a heat sink disposed between a back side of the casing and the printed circuit board, the heat sink thermally contacting both the back side of the casing, and a framework of louvers disposed over the printed circuit board, the framework of louvers disposed between rows of the LEDs;

forming a preassembled display system at a first location by using the attachment points of the display panels to attach each of the display panels to a frame, the preassembled display system being at least 6 ft.×12 ft.;

having the preassembled display system loaded onto a transportation vehicle;

having the transportation vehicle with the preassembled display system moved toward a second location;

installing the display unit at the second location by attaching the preassembled display system to a mounting unit;

attaching a receiver box for providing media to display at the plurality of display panels, the attaching being performed at the first location or at the second location; and electrically connecting the plurality of display panels to the receiver box, the electrically connecting being performed at the first location or at the second location.

2. The method of claim 1, wherein the plurality of display panels is arranged in rows and columns and mounted to the frame, wherein each display panel comprises an array of display pixel units at a front side and a power converter attached to a back side of the display panel facing away from the front side, the power converter configured to generate a power supply for the respective display panel;

wherein each display panel comprises a driver coupled to the array of display pixel units, wherein the receiver box is housed in a housing that is separate from housings of each of the plurality of display panels;

wherein the frame is configured to provide mechanical support to the plurality of display panels without providing hermetic sealing; and wherein each of the plurality of display panels is sealed to be waterproof.

3. The method of claim 1, wherein the casing comprises locking points for use in attachment to an adjacent casing of another display panel.

4. The method of claim 1, wherein the plurality of display panels remain exposed to the environment after the installation of the display unit.

5. The method of claim 1, further comprising attaching a power cable to a power input of the receiver box.

6. The method of claim 1, wherein the mounting unit comprises a wall mounting system, and wherein attaching the preassembled display system to the mounting unit comprises attaching the preassembled display system to the wall mounting system.

7. The method of claim 1, wherein attaching the preassembled display system to the mounting unit comprises lifting the preassembled display system and securely attaching the preassembled display system to a mounting point of the mounting unit.

8. The method of claim 1, wherein attaching the preassembled display system to the mounting unit comprises retrofitting a preexisting billboard with the preassembled display system.

9. The method of claim 8, wherein retrofitting the preexisting billboard with the preassembled display system comprises:

removing a canvas layer of the billboard to expose a solid mounting surface;

removing the solid mounting surface; and attaching the preassembled display system to a central load bearing pillar.

10. The method of claim 1, wherein the first location is an off-site assembly shop, and wherein the second location is an on-site location at which the display is located.

11. The method of claim 1, wherein the plurality of display panels comprise light emitting diode display panels.

12. The method of claim 1, wherein the plurality of display panels comprise organic displays, micro-mirror displays, plasma displays, liquid crystal displays, surface-conduction electron-emitter displays, field emission displays.

13. The method of claim 1, wherein forming the preassembled display system at the first location comprises forming a plurality of preassembled display systems at the first location, each preassembled display system having a plurality of display panels attached to a frame, each preassembled display system being at least 6 ft.×12 ft.;

wherein having the preassembled display system loaded onto the transportation vehicle and having the transportation vehicle with the preassembled display system moved toward the second location comprises having the plurality of preassembled display systems transported to the second location; and wherein installing the display unit at the second location comprises installing the plurality of preassembled display systems at the second location, the plurality of preassembled display systems together forming an integrated display unit.

14. The method of claim 13, wherein each display system includes a cat walk that is pre-assembled with the display system at the first location.

15. The method of claim 14, wherein the preassembled display systems are mounted in an array of rows and columns, wherein each cat walk of the display systems in a first one of the columns includes a ladder such that cat walks of the display sections of the first one of the columns have a common ladder.

16. The method of claim 15, wherein, after mounting the plurality of preassembled display systems, the cat walks of laterally adjacent display sections are connected together to form a continuous walkway.

17. The method of claim 13, wherein the preassembled display systems are assembled on a sidewalk and lifted up to a mounting point.

18. The method of claim 13, further comprising assembling the preassembled display systems into a plurality of super sections at the second location, lifting the assembled plurality of super sections to mounting points, and mounting the plurality of super sections to form the integrated display unit.

19. The method of claim 13, wherein installing the display unit comprises lifting the preassembled display systems and then assembling the preassembled display systems at a mounting point.

20. The method of claim 13, wherein each of the display panels is sealed to be waterproof, wherein the integrated display unit includes no cabinets; and wherein the integrated display unit is cooled passively and includes no air conditioning or fans.

21. The method of claim 13, wherein installing the plurality of preassembled display systems at the second location comprises:

mounting the plurality of preassembled display systems to the mounting unit so as to form the integrated display unit, which includes an array of rows and columns of the display panels; and electrically connecting display panels of each preassembled display system to display panels of an adjacent preassembled display system so that power and data can be provided throughout the integrated display unit.

22. The method of claim 21, wherein electrically connecting each of the display panels to the receiver box comprises electrically coupling a first display panel in each row to the receiver box and daisy-chain coupling the other LED display panels in each row to an adjacent LED display panel.

23. The method of claim 21, wherein electrically connecting display panels of each preassembled display system to display panels of the adjacent preassembled display system comprises electrically connecting data and power.

24. The method of claim 23, wherein electrically connecting display panels of each preassembled display system to display panels of the adjacent preassembled display system comprises electrically connecting using an integrated data and power cable that comprises a plurality of data wires and a plurality of power wires within a single cable and a connector coupled to the data wires and the power wires, the connector comprising:

a plurality of male connectors surrounded by an end enclosure and accessible outside the connector, each male connector of the plurality of male connectors configured to fit into a female connector, wherein the plurality of male connectors comprises three pins for carrying AC power to power supply circuitry of an associated display panel; and a plurality of female connectors surrounded by the end enclosure, each female connector of the plurality of female connectors configured to receive a pin, wherein the plurality of female connectors are configured to carry data to image control circuitry of the associated display panel, wherein the connector is configured to be waterproof when connected to another connector.

25. The method of claim 13, wherein each display panel in the display unit comprises an array of light emitting pixels that are spaced at a pitch, wherein the pitch is selected from the group consisting of 6.35 mm, 7.62 mm, 9.525 mm, 12.7 mm, 15.24 mm, 19.05 mm, 25.4 mm, and 30.48 mm.

26. The method of claim 25, wherein each display panel in the display unit has the same size, the same shape and the same pitch.

27. The method of claim 25, wherein each display panel in the display unit has the same size and the same shape, wherein each display panel in any given preassembled display system has the same pitch, and wherein the display unit includes display panels with different pitches.

28. The method of claim 1, wherein forming the preassembled display system comprises:

assembling the frame, the frame comprising a plurality of members; and attaching the display panels directly to the frame using a plurality of corner plates, wherein each lighting panel is mechanically coupled to one of the members and three other lighting panels by one of the corner plates.

29. The method of claim 28, wherein, after installing the display unit at the second location, the method further comprises:

determining that one of the plurality of display panels is a defective display panel;

electrically disconnecting the defective display panel from the display unit;

removing the corner plate from the defective display panel;

removing the defective display panel from the display unit;

placing a replacement display panel at a location formerly taken by the defective display panel;

attaching a corner plate to the replacement display panel; and electrically connecting the replacement display panel to the display unit.

30. A method of performing an installation of a display unit, the method comprising:

forming a plurality of preassembled display systems at a first location by attaching a plurality of display panels to a plurality of frames, each preassembled display system having a plurality of display panels attached to one of the plurality of frames, each preassembled display system being at least 6 ft.×12 ft.;

having the plurality of preassembled display systems loaded onto a transportation vehicle;

having the transportation vehicle with the plurality of preassembled display systems moved toward a second location;

at the second location, installing the plurality of preassembled display systems to a mounting unit, the plurality of preassembled display systems together forming an integrated display unit, wherein installing the plurality of preassembled display systems at the second location comprises:

using a plurality of integrated data and power cables, electrically connecting display panels of each preassembled display system to display panels of an adjacent preassembled display system, wherein each of the plurality of integrated data and power cables comprises a plurality of data wires and a plurality of power wires within a single cable and a connector coupled to the data wires and the power wires, the connector comprising:

a plurality of connectors of a first type surrounded by an end enclosure and accessible outside the connector, wherein the plurality of connectors of the first type comprises three connectors for carrying AC power to power supply circuitry of an associated display panel; and a plurality of connectors of a second type surrounded by the end enclosure, each of the plurality of connectors of the first type configured to fit into one of the plurality of connectors of a second type, wherein each of the plurality of connectors of the second type configured to receive one of the plurality of connectors of the first type, wherein the plurality of connectors of the second type is configured to carry data to image control circuitry of the associated display panel, wherein the connector is configured to be waterproof when connected to another connector; and attaching a receiver box for providing media to display at the plurality of display panels, the attaching being performed at the first location or at the second location; and electrically connecting the plurality of display panels to the receiver box, the electrically connecting being performed at the first location or at the second location.

* * * * *